(12) United States Patent
Goldfarb

(10) Patent No.: US 8,478,769 B2
(45) Date of Patent: Jul. 2, 2013

(54) CONVERSATIONAL QUESTION GENERATION SYSTEM ADAPTED FOR AN INSURANCE CLAIM PROCESSING SYSTEM

(75) Inventor: Eugene Goldfarb, Whitehouse Station, NJ (US)

(73) Assignee: Accenture Global Services Limited, Dublin (IE)

( * ) Notice: Subject to any disclaimer, the term of this patent is extended or adjusted under 35 U.S.C. 154(b) by 746 days.

(21) Appl. No.: 12/036,103

(22) Filed: Feb. 22, 2008

(65) Prior Publication Data
US 2009/0216772 A1    Aug. 27, 2009

(51) Int. Cl.
G06F 17/30    (2006.01)
(52) U.S. Cl.
USPC ............................. 707/758; 707/944; 705/4
(58) Field of Classification Search
USPC ......... 707/758, 944, 999.003, 999.107; 705/4
See application file for complete search history.

(56) References Cited

U.S. PATENT DOCUMENTS

| | | |
|---|---|---|
| 4,648,037 A | 3/1987 | Valentino |
| 4,713,755 A | 12/1987 | Worley, Jr. et al. |
| 4,796,181 A | 1/1989 | Wiedemer |
| 4,831,526 A | 5/1989 | Luchs et al. |
| 4,975,840 A | 12/1990 | DeTore et al. |
| 5,093,794 A | 3/1992 | Howie et al. |
| 5,128,859 A | 7/1992 | Carbone et al. |
| 5,181,162 A | 1/1993 | Smith et al. |
| 5,182,705 A | 1/1993 | Barr et al. |
| 5,191,522 A | 3/1993 | Bosco et al. |
| 5,208,748 A | 5/1993 | Flores et al. |
| 5,216,603 A | 6/1993 | Flores et al. |
| 5,241,664 A | 8/1993 | Ohba et al. |
| 5,253,362 A | 10/1993 | Nolan et al. |
| 5,307,262 A | 4/1994 | Ertel |
| 5,325,291 A | 6/1994 | Garrett et al. |
| 5,367,619 A | 11/1994 | Dipaolo et al. |
| 5,386,556 A | 1/1995 | Hedin et al. |
| 5,392,428 A | 2/1995 | Robins |
| 5,404,518 A | 4/1995 | Gilbertson et al. |
| 5,420,973 A | 5/1995 | Dagdeviren |

(Continued)

FOREIGN PATENT DOCUMENTS

| | | |
|---|---|---|
| EP | 0841612 A2 | 5/1998 |
| EP | 0844558 A2 | 5/1998 |

(Continued)

OTHER PUBLICATIONS

Page 1 of the 1996 definition of "hypertext" available at: http://web.archive.org/web/20010410184742/http://www.webopedia.com/TERM/H/hypertext.html.*

(Continued)

*Primary Examiner* — Leslie Wong
(74) *Attorney, Agent, or Firm* — Brinks Hofer Gilson & Lione

(57) ABSTRACT

A conversational question generation system dynamically generates conversational questions for insurance claim processing. The conversational question generation system includes various modules and graphical user interfaces that provide a streamlined mechanism for creating new conversational questions for insurance claim processing. The conversational question generation system may include various levels of usability that distinguish between a question programmer of the conversational question generation system and an insurance claim agent that uses the created conversational questions. In generating conversational questions, the conversational question generation system may include graphical user interfaces directed to the question details, the answer details, the question text, or other aspects of the conversational questions.

22 Claims, 19 Drawing Sheets

U.S. PATENT DOCUMENTS

| | | | |
|---|---|---|---|
| 5,428,731 A | 6/1995 | Powers, III | 395/154 |
| 5,445,653 A | 8/1995 | Hixson et al. | |
| 5,446,653 A | 8/1995 | Miller et al. | |
| 5,523,942 A | 6/1996 | Tyler et al. | |
| 5,530,861 A | 6/1996 | Diamant et al. | |
| 5,557,515 A | 9/1996 | Abbruzzese et al. | |
| 5,581,682 A | 12/1996 | Anderson et al. | |
| 5,592,611 A | 1/1997 | Midgely et al. | |
| 5,602,982 A | 2/1997 | Judd et al. | 395/326 |
| 5,613,108 A | 3/1997 | Morikawa | |
| 5,627,764 A | 5/1997 | Schutzman et al. | |
| 5,630,069 A | 5/1997 | Flores et al. | |
| 5,632,015 A | 5/1997 | Zimowski et al. | |
| 5,640,501 A | 6/1997 | Turpin | |
| 5,649,182 A | 7/1997 | Reitz | |
| 5,655,085 A | 8/1997 | Ryan et al. | |
| 5,664,109 A | 9/1997 | Johnson et al. | |
| 5,671,360 A | 9/1997 | Hambrick et al. | |
| 5,673,402 A | 9/1997 | Ryan et al. | |
| 5,675,745 A | 10/1997 | Oku et al. | |
| 5,687,385 A | 11/1997 | Janay | |
| 5,692,501 A | 12/1997 | Minturn | |
| 5,701,400 A | 12/1997 | Amado | |
| 5,706,452 A | 1/1998 | Ivanov | |
| 5,721,913 A | 2/1998 | Ackroff et al. | |
| 5,721,940 A | 2/1998 | Luther et al. | |
| 5,724,575 A | 3/1998 | Hoover et al. | |
| 5,726,884 A | 3/1998 | Sturgeon et al. | |
| 5,734,837 A | 3/1998 | Flores et al. | |
| 5,742,836 A | 4/1998 | Turpin et al. | |
| 5,745,687 A | 4/1998 | Randell | |
| 5,745,901 A | 4/1998 | Entner et al. | |
| 5,752,055 A | 5/1998 | Redpath et al. | |
| 5,754,858 A | 5/1998 | Broman et al. | 395/701 |
| 5,758,351 A | 5/1998 | Gibson et al. | |
| 5,765,170 A | 6/1998 | Morikawa | |
| 5,768,506 A | 6/1998 | Randell | |
| 5,790,116 A | 8/1998 | Malone et al. | |
| 5,799,297 A | 8/1998 | Goodridge et al. | |
| 5,809,318 A | 9/1998 | Rivette et al. | |
| 5,809,478 A | 9/1998 | Greco et al. | |
| 5,819,230 A | 10/1998 | Christie et al. | |
| 5,826,020 A | 10/1998 | Randell | |
| 5,826,237 A | 10/1998 | Macrae et al. | |
| 5,826,239 A | 10/1998 | Du et al. | |
| 5,836,011 A | 11/1998 | Hambrick et al. | |
| 5,839,112 A | 11/1998 | Schreitmueller et al. | |
| 5,845,289 A | 12/1998 | Baumeister et al. | |
| 5,848,271 A | 12/1998 | Caruso et al. | 395/680 |
| 5,848,393 A | 12/1998 | Goodridge et al. | |
| 5,855,005 A | 12/1998 | Schuler et al. | |
| 5,860,066 A | 1/1999 | Rouse | |
| 5,862,327 A | 1/1999 | Kwang et al. | |
| 5,867,385 A | 2/1999 | Brown et al. | |
| 5,870,711 A | 2/1999 | Huffman | |
| 5,873,066 A | 2/1999 | Underwood et al. | |
| 5,875,330 A | 2/1999 | Goti | |
| 5,881,230 A | 3/1999 | Christensen et al. | |
| 5,884,256 A | 3/1999 | Bennett et al. | |
| 5,886,693 A | 3/1999 | Ho et al. | |
| 5,890,130 A | 3/1999 | Cox et al. | |
| 5,890,133 A | 3/1999 | Ernst | |
| 5,899,989 A | 5/1999 | Ikeuchi et al. | |
| 5,903,873 A | 5/1999 | Peterson et al. | |
| 5,907,828 A | 5/1999 | Meyer et al. | |
| 5,920,696 A | 7/1999 | Brandt et al. | |
| 5,925,100 A | 7/1999 | Drewry et al. | |
| 5,940,804 A | 8/1999 | Turley et al. | |
| 5,946,694 A | 8/1999 | Copeland et al. | |
| 5,950,169 A | 9/1999 | Borghesi et al. | 705/4 |
| 5,956,687 A | 9/1999 | Wamsley et al. | |
| 5,970,464 A | 10/1999 | Apte et al. | |
| 5,974,390 A | 10/1999 | Ross | |
| 5,987,247 A | 11/1999 | Lau | 395/702 |
| 5,991,733 A | 11/1999 | Aleia et al. | |
| 5,999,911 A | 12/1999 | Berg et al. | |
| 6,002,396 A | 12/1999 | Davies | |
| 6,003,007 A | 12/1999 | DiRienzo | |
| 6,003,011 A | 12/1999 | Sarin et al. | |
| 6,012,066 A | 1/2000 | Discount et al. | |
| 6,021,418 A | 2/2000 | Brandt et al. | |
| 6,023,572 A | 2/2000 | Lautzenheiser et al. | |
| 6,023,578 A | 2/2000 | Birsan et al. | |
| 6,028,997 A | 2/2000 | Leymann et al. | |
| 6,038,590 A | 3/2000 | Gish | |
| 6,041,304 A | 3/2000 | Meyer et al. | |
| 6,044,382 A | 3/2000 | Martino | |
| 6,044,384 A | 3/2000 | Ishima et al. | |
| 6,049,773 A | 4/2000 | McCormack et al. | |
| 6,055,519 A | 4/2000 | Kennedy et al. | |
| 6,058,413 A | 5/2000 | Flores et al. | |
| 6,061,665 A | 5/2000 | Bahreman et al. | |
| 6,065,000 A | 5/2000 | Jensen | |
| 6,065,009 A | 5/2000 | Leymann et al. | |
| 6,067,525 A | 5/2000 | Johnson et al. | |
| 6,070,152 A | 5/2000 | Carey et al. | |
| 6,073,109 A | 6/2000 | Flores et al. | |
| 6,076,066 A | 6/2000 | DiRienzo et al. | |
| 6,078,890 A | 6/2000 | Mangin et al. | |
| 6,098,070 A | 8/2000 | Maxwell | |
| 6,101,488 A | 8/2000 | Hayashi et al. | |
| 6,108,673 A | 8/2000 | Brandt et al. | |
| 6,112,190 A | 8/2000 | Fletcher et al. | |
| 6,115,646 A | 9/2000 | Fiszman et al. | |
| 6,119,093 A | 9/2000 | Walker et al. | |
| 6,125,363 A | 9/2000 | Buzzeo et al. | |
| 6,131,085 A * | 10/2000 | Rossides | 705/1.1 |
| 6,131,155 A | 10/2000 | Alexander et al. | |
| 6,134,536 A | 10/2000 | Shepherd | |
| 6,141,011 A | 10/2000 | Bodnar et al. | |
| 6,151,660 A | 11/2000 | Aoki | |
| 6,158,044 A | 12/2000 | Tibbetts | |
| 6,163,781 A | 12/2000 | Wess, Jr. | |
| 6,163,784 A | 12/2000 | Taguchi | |
| 6,170,002 B1 | 1/2001 | Ouchi | |
| 6,182,095 B1 | 1/2001 | Leymaster et al. | 707/515 |
| 6,182,274 B1 | 1/2001 | Lau | |
| 6,189,029 B1 | 2/2001 | Fuerst | 709/217 |
| 6,199,099 B1 | 3/2001 | Gershman et al. | |
| 6,222,925 B1 | 4/2001 | Shiels et al. | 380/211 |
| 6,223,164 B1 | 4/2001 | Seare et al. | |
| 6,230,169 B1 | 5/2001 | Nagae | |
| 6,233,537 B1 | 5/2001 | Gryphon et al. | |
| 6,253,369 B1 | 6/2001 | Cloud et al. | |
| 6,256,636 B1 | 7/2001 | Choy | |
| 6,262,729 B1 | 7/2001 | Marcos et al. | |
| 6,266,645 B1 | 7/2001 | Simpson | |
| 6,266,666 B1 | 7/2001 | Ireland et al. | |
| 6,272,482 B1 | 8/2001 | McKee et al. | |
| 6,278,977 B1 | 8/2001 | Agrawal et al. | |
| 6,279,009 B1 | 8/2001 | Smirnov et al. | |
| 6,289,348 B1 | 9/2001 | Richard et al. | |
| 6,289,385 B1 | 9/2001 | Whipple et al. | |
| 6,304,886 B1 | 10/2001 | Bernardo et al. | |
| 6,308,188 B1 | 10/2001 | Bernardo et al. | |
| 6,308,224 B1 | 10/2001 | Leymann et al. | |
| 6,311,192 B1 | 10/2001 | Rosenthal et al. | |
| 6,321,133 B1 | 11/2001 | Smirnov et al. | |
| 6,321,374 B1 | 11/2001 | Choy | |
| 6,327,046 B1 | 12/2001 | Miyamoto et al. | |
| 6,330,541 B1 | 12/2001 | Meyer et al. | |
| 6,332,155 B1 | 12/2001 | Notani | |
| 6,334,146 B1 | 12/2001 | Parasnis et al. | |
| 6,336,096 B1 | 1/2002 | Jernberg | |
| 6,343,271 B1 | 1/2002 | Peterson et al. | |
| 6,347,303 B2 | 2/2002 | Nagai et al. | |
| 6,349,238 B1 | 2/2002 | Gabbita et al. | |
| 6,349,320 B1 | 2/2002 | Emberton et al. | |
| 6,356,905 B1 | 3/2002 | Gershman et al. | |
| 6,370,508 B2 | 4/2002 | Beck et al. | |
| 6,380,951 B1 | 4/2002 | Petchenkine et al. | |
| 6,389,588 B1 | 5/2002 | Wadhwa et al. | |
| 6,393,431 B1 | 5/2002 | Salvati et al. | |
| 6,393,456 B1 | 5/2002 | Ambler et al. | |
| 6,397,191 B1 | 5/2002 | Notani et al. | |
| 6,397,192 B1 | 5/2002 | Notani et al. | |
| 6,415,259 B1 | 7/2002 | Wolfinger et al. | |

| | | | | | | |
|---|---|---|---|---|---|---|
| 6,426,759 B1 | 7/2002 | Ting et al. | | 6,993,528 B1 | 1/2006 | Aver et al. |
| 6,442,528 B1 | 8/2002 | Notani et al. | | 7,000,186 B1 | 2/2006 | Gropper et al. |
| 6,442,557 B1 | 8/2002 | Buteau et al. | | 7,007,227 B1 | 2/2006 | Constantino et al. |
| 6,442,563 B1 | 8/2002 | Bacon et al. | | 7,013,284 B2 * | 3/2006 | Guyan et al. ............ 705/4 |
| 6,470,303 B2 | 10/2002 | Kidd et al. | | 7,013,309 B2 | 3/2006 | Chakraborty et al. |
| 6,493,675 B1 | 12/2002 | Kanaya et al. | | 7,031,951 B2 | 4/2006 | Mancisidor et al. |
| 6,496,202 B1 | 12/2002 | Prinzing | | 7,039,597 B2 | 5/2006 | Notani et al. |
| 6,501,832 B1 | 12/2002 | Saylor et al. | | 7,047,535 B2 | 5/2006 | Lee et al. |
| 6,505,176 B2 | 1/2003 | DeFrancesco, Jr. et al. | | 7,051,036 B2 | 5/2006 | Rosnow et al. |
| 6,516,322 B1 | 2/2003 | Meredith | | 7,051,071 B2 | 5/2006 | Stewart et al. |
| 6,519,578 B1 | 2/2003 | Reddy ............ 706/45 | | 7,051,072 B2 | 5/2006 | Stewart et al. |
| 6,535,883 B1 | 3/2003 | Lee et al. | | 7,051,074 B1 | 5/2006 | Buchsbaum et al. |
| 6,546,396 B1 | 4/2003 | Borkowski et al. | | 7,065,504 B2 | 6/2006 | Sakuma et al. |
| 6,549,893 B1 | 4/2003 | Lannert et al. | | 7,069,234 B1 | 6/2006 | Cornelius et al. ............ 705/26 |
| 6,564,321 B2 | 5/2003 | Bobo, II | | 7,069,536 B2 | 6/2006 | Yaung |
| 6,567,783 B1 | 5/2003 | Notani et al. | | 7,076,504 B1 | 7/2006 | Handel et al. |
| 6,574,636 B1 | 6/2003 | Balon et al. | | 7,100,147 B2 | 8/2006 | Miller et al. |
| 6,584,464 B1 | 6/2003 | Warthen | | 7,103,590 B1 | 9/2006 | Murthy et al. |
| 6,603,854 B1 | 8/2003 | Judkins et al. | | 7,110,952 B2 | 9/2006 | Kursh |
| 6,606,740 B1 | 8/2003 | Lynn et al. ............ 717/100 | | 7,113,913 B1 | 9/2006 | Davis et al. |
| 6,625,602 B1 | 9/2003 | Meredith et al. | | 7,117,271 B2 | 10/2006 | Haverstock et al. |
| 6,632,251 B1 | 10/2003 | Rutten et al. | | 7,124,203 B2 | 10/2006 | Joshi et al. |
| 6,633,846 B1 | 10/2003 | Bennett et al. | | 7,150,000 B1 | 12/2006 | Feldman |
| 6,651,060 B1 | 11/2003 | Harper et al. | | 7,171,647 B1 | 1/2007 | Smith et al. |
| 6,658,398 B1 | 12/2003 | Bertrand et al. ............ 706/47 | | 7,174,349 B1 | 2/2007 | Alavi et al. |
| 6,658,432 B1 | 12/2003 | Alavi et al. | | 7,174,506 B1 | 2/2007 | Dunsmoir et al. |
| 6,665,640 B1 | 12/2003 | Bennett et al. | | 7,174,514 B2 | 2/2007 | Subramaniam et al. |
| 6,671,692 B1 | 12/2003 | Marpe et al. | | 7,181,427 B1 | 2/2007 | De Francesco et al. |
| 6,671,693 B1 | 12/2003 | Marpe et al. | | 7,184,967 B1 | 2/2007 | Mital et al. |
| 6,671,716 B1 | 12/2003 | Diedrichsen et al. | | 7,188,073 B1 | 3/2007 | Tam et al. |
| 6,679,959 B2 | 1/2004 | Boyd et al. | | 7,194,679 B1 | 3/2007 | Green |
| 6,681,217 B1 | 1/2004 | Lewak ............ 707/3 | | 7,203,654 B2 | 4/2007 | Menendez |
| 6,684,190 B1 | 1/2004 | Powers et al. | | 7,216,163 B2 | 5/2007 | Sinn |
| 6,687,557 B2 | 2/2004 | Ouchi | | 7,219,050 B2 | 5/2007 | Ishikawa et al. |
| 6,687,685 B1 | 2/2004 | Sadeghi et al. | | 7,228,547 B2 | 6/2007 | Yaung |
| 6,687,878 B1 | 2/2004 | Eintracht et al. | | 7,242,991 B2 | 7/2007 | Budinger et al. |
| 6,691,100 B1 | 2/2004 | Alavi et al. | | 7,249,157 B2 | 7/2007 | Stewart et al. |
| 6,697,784 B2 | 2/2004 | Bacon et al. | | 7,249,180 B2 | 7/2007 | Erickson et al. |
| 6,697,824 B1 | 2/2004 | Bowman-Amuah ......... 707/229 | | 7,269,621 B2 | 9/2007 | Chang et al. |
| 6,714,914 B1 | 3/2004 | Peters et al. | | 7,269,718 B2 | 9/2007 | Alexander, III et al. |
| 6,725,224 B1 | 4/2004 | McCarthy et al. | | 7,275,216 B2 | 9/2007 | Paoli et al. |
| 6,728,947 B1 | 4/2004 | Bengston | | 7,296,056 B2 | 11/2007 | Yaung |
| 6,738,736 B1 | 5/2004 | Bond | | 7,305,488 B2 | 12/2007 | Wallace et al. |
| 6,738,757 B1 | 5/2004 | Wynne et al. | | 7,310,607 B2 | 12/2007 | Brandt et al. |
| 6,763,353 B2 | 7/2004 | Li et al. | | 7,333,967 B1 | 2/2008 | Bringsjord et al. ............ 706/45 |
| 6,768,984 B2 | 7/2004 | Allen et al. | | 7,337,121 B1 | 2/2008 | Beinat et al. |
| 6,769,112 B1 | 7/2004 | Montana et al. | | 7,398,218 B1 | 7/2008 | Bernaski et al. |
| 6,810,383 B1 | 10/2004 | Loveland | | 7,464,369 B1 | 12/2008 | Banerjee et al. ............ 717/106 |
| 6,816,849 B1 | 11/2004 | Halt, Jr. ............ 707/1 | | 7,506,143 B2 | 3/2009 | Sarwono et al. ............ 713/1 |
| 6,826,579 B1 | 11/2004 | Leymann et al. | | 7,613,641 B1 | 11/2009 | Jenkins et al. ............ 705/35 |
| 6,832,368 B1 | 12/2004 | Zimowski | | 7,617,240 B2 | 11/2009 | Guyan et al. |
| 6,850,996 B2 | 2/2005 | Wagner | | 7,618,259 B2 | 11/2009 | Manos ............ 434/322 |
| 6,862,732 B1 | 3/2005 | Schultz et al. | | 7,698,543 B2 | 4/2010 | Sarwono et al. ............ 713/1 |
| 6,868,193 B1 | 3/2005 | Gharbia et al. | | 7,886,226 B1 | 2/2011 | McCoy et al. ............ 715/273 |
| 6,871,197 B1 | 3/2005 | Johnson ............ 706/61 | | 7,895,064 B2 | 2/2011 | Wahlbin ............ 705/4 |
| 6,874,008 B1 | 3/2005 | Eason et al. | | 7,933,786 B2 | 4/2011 | Wargin et al. |
| 6,877,137 B1 | 4/2005 | Rivette et al. | | 8,032,837 B2 | 10/2011 | Bowman et al. ............ 715/760 |
| 6,877,153 B2 | 4/2005 | Konnersman | | 8,069,131 B1 | 11/2011 | Luechtefeld et al. |
| 6,879,959 B1 | 4/2005 | Chapman et al. | | 8,131,663 B1 | 3/2012 | Taylor ............ 706/59 |
| 6,879,970 B2 | 4/2005 | Shiffman et al. | | 2001/0034639 A1 | 10/2001 | Jacoby et al. ............ 705/10 |
| 6,888,929 B1 | 5/2005 | Saylor et al. | | 2002/0035488 A1 | 3/2002 | Aquila et al. |
| 6,889,375 B1 | 5/2005 | Chan et al. | | 2002/0049628 A1 | 4/2002 | West et al. |
| 6,895,084 B1 | 5/2005 | Saylor et al. | | 2002/0068857 A1 | 6/2002 | Iliff |
| 6,896,574 B2 | 5/2005 | Needham et al. | | 2002/0069083 A1 | 6/2002 | Harter et al. ............ 705/1 |
| 6,898,574 B1 | 5/2005 | Regan | | 2002/0120491 A1 | 8/2002 | Nelson ............ 705/10 |
| 6,901,405 B1 | 5/2005 | McCrady et al. | | 2002/0135614 A1 | 9/2002 | Bennett ............ 345/745 |
| 6,918,053 B1 | 7/2005 | Thatte et al. | | 2002/0165739 A1 | 11/2002 | Guyan et al. |
| 6,920,456 B2 | 7/2005 | Lee et al. | | 2002/0188674 A1 | 12/2002 | Brown et al. |
| 6,925,593 B1 | 8/2005 | Knutson et al. | | 2003/0009357 A1 | 1/2003 | Pish |
| 6,928,487 B2 | 8/2005 | Eggebraaten et al. | | 2003/0023641 A1 | 1/2003 | Gorman et al. ............ 707/530 |
| 6,937,990 B1 | 8/2005 | Walker et al. | | 2003/0105884 A1 | 6/2003 | Upton ............ 709/318 |
| 6,938,030 B1 | 8/2005 | Simone, Jr. et al. | | 2003/0113699 A1 | 6/2003 | Johnson et al. |
| 6,940,870 B2 | 9/2005 | Hamlin | | 2003/0145124 A1 | 7/2003 | Guyan et al. |
| 6,941,521 B2 | 9/2005 | Lin et al. | | 2003/0200527 A1 | 10/2003 | Lynn et al. |
| 6,948,133 B2 | 9/2005 | Haley | | 2004/0111301 A1 * | 6/2004 | Wahlbin et al. ............ 705/4 |
| 6,952,679 B1 | 10/2005 | Pulford | | 2004/0205157 A1 | 10/2004 | Bibelnieks et al. ............ 709/218 |
| 6,970,931 B1 | 11/2005 | Bellamy et al. | | 2004/0225535 A1 | 11/2004 | Bond, Jr. et al. |
| 6,973,626 B1 | 12/2005 | Lahti et al. | | 2005/0022160 A1 | 1/2005 | Uluakar et al. ............ 717/105 |
| 6,975,914 B2 | 12/2005 | DeRemer et al. | | 2005/0055263 A1 | 3/2005 | Pabuwal |

| | | | |
|---|---|---|---|
| 2005/0131752 A1 | 6/2005 | Gracie et al. ............ 705/10 | |
| 2005/0187881 A1 | 8/2005 | McGriffin et al. | |
| 2005/0234755 A1 | 10/2005 | Baggett, Jr. et al. ............ 705/7 | |
| 2005/0246206 A1 | 11/2005 | Obora et al. | |
| 2006/0040748 A1 | 2/2006 | Barthold ............ 463/43 | |
| 2006/0047540 A1 | 3/2006 | Hutten et al. | |
| 2006/0101127 A1 | 5/2006 | Brown ............ 709/207 | |
| 2006/0185019 A1 | 8/2006 | Wong ............ 726/26 | |
| 2006/0218017 A1 | 9/2006 | Ren et al. | |
| 2007/0005463 A1 | 1/2007 | Davis et al. | |
| 2007/0005515 A1 | 1/2007 | Rosenberg ............ 705/76 | |
| 2007/0099684 A1 | 5/2007 | Butterworth ............ 463/1 | |
| 2007/0156463 A1 | 7/2007 | Burton et al. | |
| 2007/0162454 A1 | 7/2007 | D'Albora et al. | |
| 2007/0255601 A1 | 11/2007 | Heydon et al. | |
| 2008/0028313 A1 | 1/2008 | Ebert ............ 715/730 | |
| 2008/0104065 A1* | 5/2008 | Agarwal et al. ............ 707/6 | |
| 2008/0134338 A1 | 6/2008 | Chen et al. | |
| 2008/0189092 A1* | 8/2008 | Hagelin et al. ............ 703/8 | |
| 2008/0275746 A1 | 11/2008 | Musier et al. ............ 705/7 | |
| 2009/0216803 A1 | 8/2009 | Goldfarb ............ 707/104.1 | |
| 2009/0217146 A1 | 8/2009 | Goldfarb ............ 715/205 | |
| 2009/0217185 A1 | 8/2009 | Goldfarb ............ 715/763 | |
| 2009/0248481 A1 | 10/2009 | Dick et al. ............ 705/9 | |
| 2010/0031137 A1 | 2/2010 | Amaral et al. | |
| 2010/0241466 A1 | 9/2010 | Chambers et al. ............ 705/4 | |
| 2011/0106731 A1 | 5/2011 | Pearson et al. ............ 706/11 | |

FOREIGN PATENT DOCUMENTS

| | | |
|---|---|---|
| EP | 0854431 A2 | 7/1998 |
| EP | 0897149 A1 | 2/1999 |
| JP | 11-353234 A2 | 12/1999 |
| WO | WO 8401448 A1 | 4/1984 |
| WO | WO 9108543 A1 | 6/1991 |
| WO | WO 9300643 A1 | 1/1993 |
| WO | WO 9416395 A1 | 7/1994 |
| WO | WO 9503569 A2 | 2/1995 |
| WO | WO 9631828 A1 | 10/1996 |
| WO | WO 9812616 A2 | 3/1998 |
| WO | WO 9821680 A1 | 5/1998 |
| WO | WO 9838563 A2 | 9/1998 |
| WO | WO 0067180 A2 | 11/2000 |
| WO | WO 0067181 A2 | 11/2000 |
| WO | WO 0067182 A2 | 11/2000 |
| WO | WO 0067184 A2 | 11/2000 |
| WO | WO 0067186 A2 | 11/2000 |

OTHER PUBLICATIONS

Accenture Claim Components version 7.0, 35 pages.
Office Action, dated Jul. 16, 2010, pp. 1-14, U.S. Appl. No. 12/036,115, U.S. Patent and Trademark Office, Virginia.
Office Action, dated Jan. 5, 2011, pp. 1-13, U.S. Appl. No. 12/036,115, U.S. Patent and Trademark Office, Virginia.
Ex Parte Reexamination Certificate, dated Dec. 6, 2011, pp. 1-2, Reexamination U.S. Appl. No. 90/010,735, U.S. Patent and Trademark Office, Virginia.
Office Action, dated Aug. 15, 2012, pp. 1-13, U.S. Appl. No. 12/036,120, U.S. Patent and Trademark Office, Virginia.
Agarwal et al., Architecting Object Applications for High Performance with Relational Databases, High Performance Object/Relational Applications. Aug. 10, 1995, pp. 1-8.
Freeman, Charles, "Microsoft Access 97 Step by Step," published by Microsoft Press, 1997, Table of Contents and Quick Look Guide vii-xiv, Finding You Best Starting Point pp. xvi-xxvi, Part 1, Lesson 1 and Lesson 2, pp. Cover-40, 63-108, 251-254.
Request for Ex Parte Reexamination, including exhibits H, I, J, and K, dated Nov. 10, 2009, for U.S. Appl. No. 09/305,234, filed May 4, 1999 and later assigned U.S. Appl. No. 90/010,735. pp. 1-831.
Order Granting Ex Parte Reexamination mailed Jan. 7, 2010, for U.S. Appl. No. 09/305,234, filed May 4, 1999 and later assigned U.S. Appl. No. 90/010,735. pp. 1-17.
U.S. Office Action mailed Sep. 24, 2010, for Reexamination No. 90/010,735 regarding commonly owned U.S. Patent No. 7,617,240. pp. 1-18.
Patent Owner's Response with Appendices dated Dec. 27, 2010, for Reexamination No. 90/010,735 regarding commonly owned U.S. Patent No. 7,617,240. pp. 1-1,103.

Final Office Action mailed Feb. 4, 2011 for Reexamination No. 90/010,735 regarding commonly owned U.S. Patent No. 7,617,240. pp. 1-22.
Office Action, dated Jan. 31, 2012, pp. 1-45, U.S. Appl. No. 12/036,120, U.S. Patent and Trademark Office, Virginia.
Office Action, dated Jul. 7, 2011, pp. 1-19, U.S. Appl. No. 12/036,120, U.S. Patent and Trademark Office, Virginia.
Office Action, dated Oct. 7, 2011, pp. 1-52, U.S. Appl. No. 12/036,119, U.S. Patent and Trademark Office, Virginia.
International Search Report dated Apr. 17, 2002, for PCT Application No. PCT/US00/12351, filed May 4, 2000. 5 pages.
International Search Report dated Jun. 3, 2002, for corresponding international application PCT/US00/12240. 2 pages.
International Search Report dated Aug. 6, 2002, for PCT Application No. PCT/US00/12501, filed May 4, 2000. 3 pages.
International Search Report dated Aug. 8, 2002 for PCT/US00/12508, 2 pages.
International Search Report dated Dec. 9, 2002 for PCT/US00/12238, 2 pages.
European Examination Report dated Feb. 18, 2004, for European Patent Application No. 00928844.0, filed May 4, 2000. 4 pages.
European Examination Report dated Feb. 1, 2005, for European Patent Application No. 00928844.0, filed May 4, 2000. 16 pages.
Extended European Search Report for European Patent Application No. 06005193.5, dated Aug. 22, 2006. 8 pages.
Accenture, Accenture to Implement Claim Components Solution for OneBeacon Insurance. available: http://newsroom.accenture.com/article_print.cfm?article_id=3830; Jan. 10, 2002, 1 Page.
Anonymous, Accountancy, "Proposals to Admit Corporate Capital Lift Off," Nov. 1993, vol. 112, Iss.1203, p. 57, printed 3 pages.
Anonymous, National Underwriter, "Market Mix," Property & Casualty/risk & Benefits Management ed.), Erlanger: vol. 97, Iss. 25, p. 47, Jun. 21, 1993. Printed 2 pages.
Baldwin, Robert W., Naming and Grouping Privileges to Simplify Security Management in Large Databases, available at http://www.cs.purdue.edu/homes/ninghui/courses/Fall03/papers/baldwin.pdf (17 pages) (Copyrighted in 1990).
Bandat, K, "Document Based Customization and Adaptation of Process" *IBM Technical Disclosure Bulletin*, Sep. 1994, pp. 629-630.
Bloss, Code optimizations for lazy evaluation, Lisp and Symbolic Computation, vol. 1, Sep. 1988, pp. 147-164.
Bulletin of the Technical Committee on Data Engineering, *IEEE Computer Society*, vol. 16 No. 2, Jun. 1993, pp. 1-56.
Claims Technology, A Five-Step Diagnosis for Your Claim Operation by John Raguin, available at http://web/archive.org/20040808072822/www.claimsmag.com/Issues/sept02/claims_tech.asp (Sep. 2002) (3 pages).
Cugola, G., et al., "Exploiting an event-based infrastructure to develop complex distributed systems," Software Engineering, 1988; Proceedings of the 1988 International Conference on Kyoto, Japan, Apr. 19-25, 1998, IEEE pp. 261-270.
Denning, Peter J. et al. "Completing the Loops," *INTERFACES: Institute for Operations Research and the Management Science*, vol. 25 No. 3, May-Jun. 1995. pp. 42-57.
Engel, James D., "Technology in claims management", *Risk Management*, vol. 42 No. 12. Dec. 1995, 2 pages.
Feiler, Peter H. et al. "An Incremental Programming Environment," *Proceedings of the 5th International Conference on Software Engineering*, San Diego, California, 1981. pp. 44-53.
Fisher, Susan, E., "Insurer streamlines info gathering" (Client/Server Deployment: Arkwright Mutual Insurance) *PC Week*, vol. 10 No. 45, Nov. 15, 1993. 2 pages.
Georgakopoulos, D., Hornick, M., "An Overflow of Work Management: From Processing Modeling to Workflow Automation Infrastructure," Distributed and Parallel Databases, © 1995 Kluwer Academic Publishers, Boston, Manufactured in The Netherlands; (1995) vol. 3, pp. 119-153.
Groiss, Herbert, et al., "Interoperability with World Wide Workflows," *1st World Conference on Integrated Design & Process Technology*, 1995, pp. 1-7.
Held, Jeffrey J., Network Computing Practice, "GroupWare in Investment Banking: Improving Revenue and Deal Flow",

*GroupWare '92*, Edited by David D. Coleman, The Conference Group, Morgan Kaufmann Publishers, 1992, pp. 461-464.
Hung K. Sun Y. Rose T. "A dynamic business object architecture for an insurance industrial project." *Proceedings of International Conference on Object Oriented Information Systems, (OOIS'97)*. Brisbane, Qld., Australia Nov. 10-12, 1997, Published 1998, abstract 1 page.
Image-Enabled App Streams Workflow for Gerling Re.(Gerling Global Reinsurance's use of keyFile's document management software and insurance Software and Systems' SICS insurance record-keeping software)(Product Information).*Insurance & Technology*, Feb. 1, 1997, 3 pages.
Kappel, G. et al., "Coordination in Workflow Management Systems A Rule-Based Approach", Department of Information Systems, University of Linz, A-4040 Linz, Austria, 1998. pp. 99-119.
Kellogg et al. "Interface management: a CORBA universal service manager," *Systems Management*, 1998. Proceedings of the IEEE Third International Workshop on Newport, RI, USA, Apr. 22-24, 1998, Los Alamitos, CA, USA, IEEE Comput. Soc., US, Apr. 22, 1998. pp. 148-149.
Koehler SH, "Objects in Insurance. Gaining the Competitive Edge in Financial Services." *Proceedings of Object Expo '94*. New York, NY, USA Jun. 6-10, 1994, Published 1994. Abstract, 1 page.
Korzeniowski, Paul, "Workflow software automates processes; passing messages on network platform helps CareAmerica process insurance claims" (use of workflow software to streamline business processes) (Client/Service Computing), *Software Magazine*, vol. 13 No. 3. Feb. 1993, 4 pages.
Koschel et al. "Configurable event triggered services for CORB-based systems," *Enterprise Distributed Object Computing Workshop*, 1998. EDOC '98 Proceedings, Second International La Jolla, CA, USA, Nov. 3-5, 1998. New York, NY, USA, IEEE, US. Nov. 1998, pp. 306-318.
McCall, Grant Watch, Health Affairs Spring 1991, pp. 164-176.
Medina-Mora, Raul et al. "ALOE Users' and Implentors' Guide," *Technical Report CMUCS-81-145*, CMU, Computer Science Department, Nov. 1981. pp. I-III and 1-79.
Medina-Mora, Raul "Syntax-Directed Editing Towards Integrated Programming Environments," *Doctoral Thesis*, Department of Computer Science, Carnegie-Mellon University. Mar. 1982, Summary pp. 1-14 and pp. 1-149.
Medina-Mora, "Action Workflow™ Technology and Applications for Groupware" *GroupWare '92*, Edited by David D. Coleman, The Conference Group, Morgan Kaufmann Publishers, 1992. pp. 165-167.
Medina-Mora, Raul et al. "The Action Workflow Approach to Workflow Management Technology," *Proceedings of the 1992 ACM conference on Computer-supported cooperative work*, Nov. 1992. pp. 281-288.
Medina-Mora, Raul et al. "ActionWorkflow in Use: Clark County Department of Business License," *Proceedings of the Twelfth International Conference on Data Engineering*, Feb.-Mar. 1996, pp. 288-294.
Medina-Mora, Raul, et al. "Action Workflow as the Enterprise Integration Technology." Bulletin of the Technical Committee on Data Engineering. *IEEE Computer Societ.* vol. 16 No. 2, pp. 49-52.
Milligan, John. "Case study: Advantage. (Motorists Insurance Companies uses Advantage, a business-rule DBMS developed in-house, to manage quoting, data entry, rating and other core processes)" (Data Architect) (Company Operations). *Database Programming & Design*, vol. 10 No. 12, Dec. 1997, 5 pages.
Nilsson, Y. "TFM: a tool for task flow management." *Philips Telecommunication and Data Systems Review*, vol. 47, No. 4, Dec. 1989, pp. 33-46. Netherlands. Abstract.
Potel, M. "MVP: Model-View-Presenter The Taligent Programming Model for C++ and Java," Taligent, Inc., 1994, 16 pages.
"Primavera Extends Lead in High-End Project Management Software," *Business Wire*, Apr. 4, 1995. 3 pages.
"Primavera Products and Solutions," www.primavera.com/products/p3.html, downloaded from internet Feb. 2, 2001, 2 pages.
Publishing a FileMaker Pro 4/5, Database on the Web: A tutorial, available at http://ion.uillinois.edu/resources/tutorials/software/tutorials/fmpro/filemakertutorial1.doc (last updated May 21, 2000) (10 pages).
Stickel E., "Competitive product development in the financial services industry—a knowledge-based approach" *International Journal of Intelligent Systems in Accounting, Finance and Management*, vol. 4, No. 4, Dec. 1995, pp. 273-287, abstract. 1 page.
Sutherland, RW, "TABLE Driven Health Insurance Claim Preparation" *IBM Technical Disclosure Bulletin*, Jul. 1986, abstract. 1 page.
Tauhert, Christy, "AFLAC cuts processing time with object system. (American Family Life Assurance, Portable Systems Technology's SmartImage insurance processing automation system) (Company Operations)". *Insurance & Technology*, vol. 22 No. 6, Jun. 1997, pp. 25(2) abstract, 1 page.
Todd, G. et al. "Microsoft Exchange Server 5.5", published by SAMS publishing, Indianapolis, Indiana, 1998, pp. i-xliii and 1-1060.
Tombros, Dimitrios et al., "Semantics of Reactive Components in Event-Driven Workflow EXecution", Institut for Informatic, Universitat Zurich, Advanced Information systems Engineering, 9th International Conference, SAiSE'97, Barcelona,Catalonia, Spain, Jun. 16-20, 1997 Proceedings, pp. 409-422.
Tsai, W.H. et al. "Architecture of a Multi-Microprocessor System for Parallel Processing of Image Sequences," *Proceedings of 1981 IEEE Computer Society Workshop on Computer Architecture of Pattern Analysis and Image Database Management*, 1981. pp. 104-111.
Tsuchiya et al. "Operator-oriented approach for the inter-work of service and network management," *Global Convergence of Telecommunications and Distributed Object Computing*, 1997. Proceedings. Tine 97 Santiago, Chile, Nov. 17-20, 1997, Los Alamitos, CA, USA, EEE Comput. Soc., US, Nov. 17, 1997. pp. 144-150.
Way, P. John Hancock streamlines legacy systems with objects. (John Hancock Mutual Life Insurance)(Company Operations). *Insurance & Technology* vol. 22. No. 9 Sep. 1997. Abstract, 1 page.
Winograd, Terry et al. (1986) Understanding Computers and Cognition: A New Foundation for Design, Ablex Publishing Corporation, Norwood, New Jersey, 1986. pp. i-xii and 1-207.
Winograd, Terry "A Language/Action Perspective on the Design of Cooperative Work," *Published in Human-Computer Interaction* vol. 3 No. 1, 1987-88, 15 pages.
Winograd, Terry, "Groupware and the Emergence of Business Technology", *Group Ware '92*, Edited by David D. Coleman, The Conference Group, Morgan Kaufmann Publishers, 1992, pp. 69-72.
Zhao, J.L., Stohr, E.A., "Temporal Workflow Management in a Claim Handling System," 1999, ACM SIGSOFT Software Engineering Notes, San Francisco, CA, USA © 1999 ACM 1-58113-070-8/99/0002. vol. 24, Issue 2,, WACC '99, Feb. 1999. pp. 187-195.
"Report on the Filing or Determination of an Action Regarding a Patent or Trademark," identifying U.S. Patent No. 7,013,284 B2 asserted in *Accenture Global Services GmbH, et al. v. Guidewire Software, Inc.*, Dkt. No. 07cv826, D. Del. Dec. 18, 2007. 1 page.
"Answers and Counterclaims," filed on Feb. 6, 2008 in lawsuit asserting U.S. Patent No. 7,013,284 B2, captioned *Accenture Global Services GmbH, et al. v. Guidewire Software, Inc.*, Dkt. No. 07cv826, D. Del. Dec. 18, 2007, 25 pages.
Accenture's Reply to Guidewire's Counterclaims with Defenses filed Mar. 25, 2008, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 13 pages. (Dkt. No. 19).
Defendant Guidewire Software Inc.'s Objections and Response to Plaintiff Accenture's First Set of Interrogatories, Aug. 22, 2008, in lawsuit asserting U.S. Patent No. 7,013,284 B2, captioned *Accenture Global Services GmbH, et al. v. Guidewire Software, Inc.*, Dkt. No. 07cv826, D. Del. Dec. 18, 2007. pp. 1-5.
Accenture's Amended Complaint for Patent Infringement, Trade Secret Misappropriation, and related State Law Claims filed Nov. 13, 2008, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 17 pages. (Dkt. No. 79).
Accenture's Second Amended Complaint for Patent Infringement, Trade Secret Misappropriation, and related State Law Claims filed Dec. 17, 2008, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 19 pages. (Dkt. No. 92).

Guidewire's Answer to Second Amended Complaint filed Jan. 9, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 19 pages. (Dkt. No. 100).

Accenture's Reply to Guidewire's Counterclaims with Defenses to Accenture's Second Amended Complaint filed Jan. 29, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 9 pages. (Dkt. No. 112).

Memorandum Opinion filed Jul. 1, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 11 pages. (Dkt. No. 224).

Accenture's Reply to Guidewire's Amended Counterclaims with Defenses to Accenture's Second Amended Complaint filed Aug. 6, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 14 pages. (Dkt. No. 259).

Joint Claim Construction Statement filed Sep. 29, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 7 pages. (Dkt. No. 294).

Joint Claim Construction Appendix vol. III of III Exhibits 3-4 filed Oct. 2, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 219 pages. (Dkt. No. 302).

Accenture's Opening Claim Construction Brief filed Oct. 2, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 31 pages. (Dkt. No. 303).

Declaration of Diana Luo in Support of Plaintiffs Accenture Global Services GmbH and Accenture LLP's Opening Claim Construction Brief filed Oct. 5, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 5 pages. (Dkt. No. 305).

Guidewire's Answering Claim Construction Brief filed on Oct. 30, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 49 pages. (Dkt. No. 316).

Declaration of Diana Luo in Support of Accenture's Claim Construction Answering Brief filed Nov. 5, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 8 pages. (Dkt. No. 322).

Redacted Accenture's Claim Construction Answering Brief filed Nov. 5, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 25 pages. (Dkt. No. 321).

Redacted Defendant Guidewire's Opening Claim Construction Brief, filed Nov. 6, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 30 pages. (Dkt. No. 325).

Accenture's Responses to Interrogatory No. 14, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 21 pages.

Accenture's Responses to Interrogatory No. 16, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 55 pages.

Memorandum Order denying without Prejudice and to be re-filed after the Supreme Court issues its ruling in *Bilski v. Doll*, 129 S. Ct. 2735 (U.S. 2009), filed Feb. 26, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 3 pages. (Dkt. No. 478).

Memorandum Order regarding claim construction of the '284 patent and '111 patent, filed Mar. 5, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 7 pages. (Dkt. No. 482).

Memorandum Opinion, filed Mar. 5, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 43 pages. (Dkt. No. 483).

Opening Brief in Support re Motion for Summary Judgment (Partial) That the '284 Patent is Invalid as Indefinite, filed Dec. 16, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 21 pages. (Dkt. No. 347).

Opening Brief in Support re Motion for Summary Judgment (Partial) That the '284 Patent is Invalid as Claiming Unpatentable Subject Matter, filed Dec. 16, 2009, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 15 pages. (Dkt. No. 349).

Redacted version of Opening Brief in Support of Motion for Summary Judgment (Partial) of Invalidity of '284 Patent because of an On-Sale Bar, filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 31 pages. (Dkt. No. 392).

Redacted version of Opening Brief in Support of Motion for Summary Judgment(Partial) of Invalidity of '284 Patent because of an On-Sale Bar, , filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 75 pages. (Dkt. No. 393).

Redacted version of Opening Brief in Support of Motion for Summary Judgment (Partial) Regarding Statute of Limitations, filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 14 pages. (Dkt. No. 395).

Redacted Version of Opening Brief in Support, of Motion for Summary Judgment That the '284 Patent is Invalid as Anticipated or, in the Alternative, Obvious, filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 46 pages. (Dkt. No. 396).

Answering Brief in Opposition re Motion for Summary Judgment (Partial) That the '284 Patent is Invalid as Anticipated or, in the Alternative, Obvious, filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 23 pages. (Dkt. No. 397).

Redacted version of Appendix, vol. 1 of 12, filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 202 pages. (Dkt. No. 398).

Redacted version of Appendix, (vol. 2 of 12—Exhibits 26-38), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 34 pages. (Dkt. No. 399).

Redacted version of Appendix, (vol. 3 of 12—Exhibits 39-58), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 44 pages. (Dkt. No. 400).

Redacted version of Appendix, (vol. 4 of 12—Exhibits 59-64), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 39 pages. (Dkt. No. 401).

Redacted version of Appendix, (vol. 5 of 12—Exhibits 65-99), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 195 pages. (Dkt. No. 404).

Redacted version of Appendix, (vol. 6 of 12—Exhibits 100-129), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 427 pages. (Dkt. No. 405).

Redacted version of Appendix, (vol. 7 of 12—Exhibits 130-154), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 467 pages. (Dkt. No. 406).

Redacted version of Appendix, (vol. 8 of 12—Exhibits 155-161), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 330 pages. (Dkt. No. 407).

Redacted version of Appendix, (vol. 9 of 12—Exhibits 162-164), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 13 pages. (Dkt. No. 408).

Redacted version of Appendix, (vol. 10 of 12—Exhibits 165-170), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 18 pages. (Dkt. No. 409).

Redacted version of Appendix, (vol. 11 of 12—Exhibit 171), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 13 pages. (Dkt. No. 410).

Redacted version of Appendix, (vol. 12 of 12—Exhibits 172-183), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 80 pages. (Dkt. No. 412).

Redacted version of Appendix, Corrected vol. 12 (Exhibits 172-183), filed Jan. 8, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 80 pages. (Dkt. No. 413).

Redacted version of Declaration of W. Michael Flaherty in Support of Plaintiffs Briefs in Opposition to Defendants' Motions for Summary Judgment, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 6 pages. (Dkt. No. 432).

Redacted version of Declaration of Diana Luo in Support of Plaintiffs Briefs in Opposition to Defendants' Motions for Partial Summary Judgment, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 68 pages. (Dkt. No. 433).

Redacted Version of Answering Brief in Opposition to Defendant's Motion for Partial Summary Judgment of Invalidity for Indefiniteness of the '284 Patent, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 22 pages. (Dkt. No. 435).

Redacted Version of Declaration of Michael Ian Shamos in Support of Plaintiffs' Brief in Opposition to Defendants Motion for Partial Summary Judgment, filed Jan. 20, 2010, in lawsuit asserting U.S. Patent No. 7,013,284 B2, captioned *Accenture Global Services GmbH, et al. v. Guidewire Software, Inc.*, Docket No. 07cv826, D. Del. Dec. 18, 2007. 6 pages. (Dkt. No. 436).

Redacted version of Answering Brief in Opposition to Defendant's Motion for Partial Summary Judgment of Invalidity of the '284 Patent as Anticipated or, in the alternative, Obvious, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 36 pages. (Dkt. No. 437).

Redacted version of Answering Brief in Opposition to Defendant's Motion for Partial Summary Judgment of Invalidity of '284 Patent Because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 51 pages. (Dkt. No. 442).

Redacted version of Declaration of Ruchika Agrawal in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 33 pages. (Dkt. No. 443).

Redacted version of Declaration of Michael Ian Shamos in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 26 pages. (Dkt. No. 444).

Redacted version of Declaration of George Victor Guyan in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 7 pages. (Dkt. No. 445).

Redacted version of Declaration of Jeffrey Wargin in Support of Accenture's Opposition to Defendant's Motion for Partial Summary Judgment of Invalidity of '284 Patent because of an On-Sale Bar, filed Jan. 20, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 8 pages. (Dkt. No. 446).

Redacted version of Reply Brief re Motion for Summary Judgment (Partial) of Invalidity of '284 Patent because of an On-Sale Bar, filed Feb. 2, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 21 pages. (Dkt. No. 454).

Redacted version of Reply Brief re Motion for Summary Judgment (Partial) That the '284 Patent is Invalid as Indefinite, filed Feb. 2, 2010, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 18 pages. (Dkt. No. 455).

Redacted version of Reply Brief re Motion for Summary Judgment (Partial) that the '284 Patent is Invalid as claiming Unpatentable Subject Matter, filed Feb. 2, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 14 pages. (Dkt. No. 456).

Redacted version of Reply Brief re Motion for Summary Judgment that the '284 is Invalid as Anticipated or, in the Alternative, Obvious, filed Feb. 2, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 13 pages. (Dkt. No. 458).

Order denying Motion for Summary Judgment (Partial) denying Motion for Summary Judgment, denying Motion for Summary Judgment, denying Motion to Strike, denying Motion for Summary Judgment, denying Motion for Summary Judgment, re Memorandum Opinion, filed Mar. 5, 2010, filed in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 2 pages. (Dkt. No. 484).

Guidewire's Supplemental Reply Brief in Support of Its Motion for Partial Summary Judgment Regarding Invalidity of the '284 and '111 Patents as Claiming Unpatentable Subject Matter filed Aug. 26, 2010, *Accenture Global Services, GMBH et al. v. Guidewire Software Inc.*, in lawsuit asserting U.S. Patent No. 7,013,284 B2, captioned *Accenture Global Services GmbH, et al. v. Guidewire Software, Inc.*, Case No. 07cv826, D. Del. Dec. 18, 2007. 10 pages. (Dkt. No. 513).

Accenture's Brief in Opposition to Guidewire's Supplemental Brief in Support of Its Motion for Partial Summary Judgment of Invalidity as Claiming Unpatentable Subject Matter filed Oct. 15, 2010, in lawsuit asserting U.S. Patent No. 7,013,284 B2, captioned *Accenture*

Global Services GmbH, et al. v. Guidewire Software, Inc., Case No. 07cv826, D. Del. Dec. 18, 2007. 15 pages. (Dkt. No. 514).
Complaint for Patent Infringement filed Nov. 10, 2009, in lawsuit asserting U.S. Patent No. 7,617,240, captioned Accenture Global Services GmbH, et al. v. Guidewire Software, Inc., Dkt. No. 09cv848, D. Del. Nov. 10, 2009. 6 pages.
Defendant Guidewire's Answer and Counterclaims to Accenture's Complaint for Patent Infringement filed Nov. 30, 2009, in lawsuit asserting U.S. Patent No. 7,617,240, captioned Accenture Global Services GmbH, et al. v. Guidewire Software, Inc., Dkt. No. 6., 09cv848, D. Del. Nov. 10, 2009, 9 pages.
Stipulation and Order to Amend Answer and Counterclaims filed Sep. 13, 2010, in lawsuit asserting U.S. Patent No. 7,617,240, captioned Accenture Global Services GmbH, et al. v. Guidewire Software, Inc., Case No. 09cv848, D. Del. Nov. 10, 2009. 46 pages. (Dkt. No. 47).
Guidewire's Amended Answer and Counterclaims to Accenture's Complaint for Patent Infringement filed Nov. 2, 2010, in lawsuit asserting U.S. Patent No. 7,617,240, captioned Accenture Global Services GmbH, et al. v. Guidewire Software, Inc., Case No. 09cv848, D. Del. Nov. 10, 2009, 18 pages. (Dkt. No. 59).
Accenture's Opening Brief in Support of Motion to Strike Allegations in Defendant Guidewire's Amended Answer and Counterclaims filed Nov. 15, 2010, in lawsuit asserting U.S. Patent No. 7,617,240, captioned Accenture Global Services GmbH, et al. v. Guidewire Software, Inc., Case No. 09cv848, D. Del. Nov. 10, 2009, 8 pages. (Dkt. No. 63).
Plaintiffs Accenture Global Service GmbH and Accenture LLP's Reply to Guidewire's Amended Counterclaims to Accenture's Complaint for Infringement of the '240 Patent filed Nov. 15, 2010, in lawsuit asserting U.S. Patent No. 7,617,240, captioned Accenture Global Services GmbH, et al. v. Guidewire Software, Inc., Case No. 09cv848, D. Del. Nov. 10, 2009, 8 pages. (Dkt. No. 65).
Office Action, mailed Feb. 26, 2001, for commonly owned U.S. Appl. No. 09/305,228, filed May 4, 1999. 7 pages.
Aug. 27, 2001 Response to Office Action mailed Feb. 26, 2001, for commonly owned U.S. Appl. No. 09/305,228, filed May 4, 1999. 9 pages.
Office Action, mailed Oct. 18, 2001, for commonly owned U.S. Appl. No. 09/305,228, filed May 4, 1999. 12 pages.
Jan. 18, 2002 Response to Office Action, mailed Oct. 18, 2001, for commonly owned U.S. Appl. No. 09/305,228, filed May 4, 1999. 6 pages.
Mar. 11, 2002 Amendment after Office Action mailed Oct. 18, 2001, for commonly owned U.S. Appl. No. 09/305,228, filed May 4, 1999 filed May 4, 1999. 16 pages.
Office Action, mailed Mar. 1, 2002, for commonly owned U.S. Appl. No. 09/305,228, filed May 4, 1999. 3 pages.
Office Action, mailed Apr. 9, 2002, for commonly owned U.S. Appl. No. 09/305,228, filed May 4, 1999. 3 pages.
Continued Prosecution Application (CPA) Request dated Apr. 18, 2002, for commonly owned U.S. Appl. No. 09/305,228, filed May 4, 1999. 2 pages.
Jul. 1, 2002 Response to Office Action, mailed Mar. 1, 2002, for commonly owned U.S. Appl. No. 09/305,228, filed May 4, 1999. 9 pages.
Office Action, mailed Sep. 11, 2002, for commonly owned U.S. Appl. No. 09/305,228, filed May 4, 1999. 10 pages.
Mar. 11, 2003 Response to Office Action mailed Sep. 11, 2002, for commonly owned U.S. Appl. No. 09/305,228, filed May 4, 1999. 14 pages.
Office Action, mailed Jun. 4, 2003, for commonly owned U.S. Appl. No. 09/305,228, filed May 4, 1999. 12 pages.
Oct. 6, 2003 Response to Office Action mailed Jun. 4, 2003, for commonly owned U.S. Appl. No. 09/305,228, filed May 4, 1999. 7 pages.
Request for Continued Examination dated Oct. 6, 2003, for commonly owned U.S. Appl. No. 09/305,228, filed May 4, 1999. 2 pages.
Office Action, mailed Oct. 22, 2003, for commonly owned U.S. Appl. No. 09/305,228, filed May 4, 1999. 11 pages.
Feb. 20, 2004 Response to Office Action mailed Oct. 22, 2003, for commonly owned U.S. Appl. No. 09/305,228, filed May 4, 1999. 8 pages.

Office Action, mailed May 13, 2004, for commonly owned U.S. Appl. No. 09/305,228, filed May 4, 1999. 12 pages.
Office Action, mailed Nov. 16, 2004, for commonly owned U.S. Appl. No. 09/305,228, filed May 4, 1999. 3 pages.
Office Action, mailed Mar. 21, 2001, for commonly owned U.S. Appl. No. 09/305,816, filed May 4, 1999. 11 pages.
Sep. 21, 2001 Response to Office Action, mailed Mar. 21, 2001, for commonly owned U.S. Appl. No. 09/305,816, filed May 4, 1999. 4 pages.
Office Action, mailed Nov. 23, 2001 for commonly owned U.S. Appl. No. 09/305,816, filed May 4, 1999. 10 pages.
Apr. 19, 2002 Response to Office Action, mailed Nov. 23, 2001 for commonly owned U.S. Appl. No. 09/305,816, filed May 4, 1999. 7 pages.
Office Action, Notice of Allowability, mailed May 3, 2002 for commonly owned U.S. Appl. No. 09/305,816, filed May 4, 1999. 9 pages.
Office Action, mailed Aug. 13, 2001, for commonly owned U.S. Appl. No. 09/305,817, filed May 4, 1999. 8 pages.
Feb. 12, 2002 Response to Office Action, mailed Aug. 13, 2001, for commonly owned U.S. Appl. No. 09/305,817, filed May 4, 1999. 14 pages.
Office Action, mailed Mar. 22, 2002, for commonly owned U.S. Appl. No. 09/305,817, filed May 4, 1999. 11 pages.
Preliminary Amendment and Continued Prosecution Application mailed Aug. 22, 2002, for commonly owned U.S. Appl. No. 09/305,817, filed May 4, 1999. 4 pages.
Oct. 9, 2002 Response to Office Action, mailed Mar. 22, 2002, for commonly owned U.S. Appl. No. 09/305,817, filed May 4, 1999. 14 pages.
Office Action, mailed Dec. 20, 2002, for commonly owned U.S. Appl. No. 09/305,817, filed May 4, 1999. 17 pages.
Jun. 20, 2003 Response to Office Action, mailed Dec. 20, 2002, for commonly owned U.S. Appl. No. 09/305,817, filed May 4, 1999. 23 pages.
Office Action, mailed Jul. 22, 2003, for commonly owned U.S. Appl. No. 09/305,817, filed May 4, 1999. 16 pages.
Office Action, mailed Apr. 6, 2004, for commonly owned U.S. Appl. No. 09/305,817, filed May 4, 1999. 2 pages.
Office Action, mailed Mar. 14, 2001, for commonly owned U.S. Appl. No. 09/305,331, filed May 4, 1999. 11 pages.
Sep. 14, 2001 Response to Office Action, mailed Mar. 14, 2001, for commonly owned U.S. Appl. No. 09/305,331, filed May 4, 1999. 10 pages.
Office Action, mailed Dec. 3, 2001, for commonly owned U.S. Appl. No. 09/305,331, filed May 4, 1999. 10 pages.
May 31, 2002 Amendment and Request for Reconsideration after Office Action mailed Dec. 3, 2001, for commonly owned U.S. Appl. No. 09/305,331, filed May 4, 1999. 12 pages.
Office Action, mailed Aug. 14, 2002, for commonly owned U.S. Appl. No. 09/305,331, filed May 4, 1999. 15 pages.
Nov. 14, 2002 Response to Office Action, mailed Aug. 14, 2002, for commonly owned U.S. Appl. No. 09/305,331, filed May 4, 1999. 13 pages.
Office Action, mailed Dec. 20, 2002, for commonly owned U.S. Appl. No. 09/305,331, filed May 4, 1999. 14 pages.
Feb. 20, 2003 Response to Office Action, mailed Dec. 20, 2002, for commonly owned U.S. Appl. No. 09/305,331, filed May 4, 1999. 7 pages.
Office Action, mailed Mar. 4, 2003, for commonly owned U.S. Appl. No. 09/305,331, filed May 4, 1999. 3 pages.
Request for Continued Examination dated Apr. 28, 2003, for commonly owned U.S. Appl. No. 09/305,331, filed May 4, 1999. 2 pages.
Office Action, mailed Jun. 30, 2003, for commonly owned U.S. Appl. No. 09/305,331, filed May 4, 1999. 15 pages.
Sep. 22, 2003 Response to Office Action, mailed Jun. 30, 2003, for commonly owned U.S. Appl. No. 09/305,331, filed May 4, 1999. 6 pages.
Office Action, mailed Dec. 3, 2003, for commonly owned U.S. Appl. No. 09/305,331, filed May 4, 1999. 2 pages.
Jan. 5, 2004 Response to Office Action, mailed Dec. 3, 2003, for commonly owned U.S. Appl. No. 09/305,331, filed May 4, 1999. 8 pages.

Feb. 2, 2004 Response to Office Action, mailed Dec. 3, 2003, for commonly owned U.S. Appl. No. 09/305,331, filed May 4, 1999. 8 pages.
Notice of Allowability mailed Oct. 27, 2004, for commonly owned U.S. Appl. No. 09/305,331, filed May 4, 1999. 9 pages.
Second Request for Ex Parte Reexamination, including exhibits I,J,K,L,M,N,O,P, and Q, dated Oct. 9, 2009, for commonly owned U.S. Appl. No. 09/305,331, filed May 4, 1999, and later assigned U.S. Appl. No. 90/010,713. 974 pages.
Order Granting Ex Parte Reeexamination mailed Dec. 17, 2009, for commonly owned U.S. Appl. No. 09/305,331, filed May 4, 1999, and later assigned U.S. Appl. No. 90/010,713. 15 pages.
U.S. Office Action mailed May 9, 2001, for commonly owned U.S. Appl. No. 09/305,234, filed May 4, 1999. 4 pages.
Nov. 27, 2001 Response to Office Action dated May 9, 2001, for commonly owned U.S. Appl. No. 09/305,234, filed May 4, 1999. 9 pages.
U.S. Office Action mailed Feb. 7, 2002, for commonly owned U.S. Appl. No. 09/305,234, filed May 4, 1999. 4 pages.
Mar. 6, 2002 Response to Office Action dated Feb. 7, 2002, for commonly owned U.S. Appl. No. 09/305,234, filed May 4, 1999. 2 pages.
U.S. Office Action dated Jun. 3, 2002, for commonly owned U.S. Appl. No. 09/305,234, filed May 4, 1999. 6 pages.
Sep. 3, 2002 Amendment in Response to Office Action dated Jun. 3, 2002, for commonly owned U.S. Appl. No. 09/305,234, filed May 4, 1999. 5 pages.
Advisory Action mailed Sep. 17, 2002, for commonly owned U.S. Appl. No. 09/305,234 filed May 4, 1999. 3 pages.
Filing of Continued Prosecution Application dated Nov. 4, 2002, for commonly owned U.S. Appl. No. 09/305,234, filed May 4, 1999. 2 pages.
U.S. Office Action mailed Nov. 26, 2002, for commonly owned U.S. Appl. No. 09/305,234, filed May 4, 1999. 4 pages.
Mar. 4, 2003 Response to Office Action dated Nov. 26, 2002, for commonly owned U.S. Appl. No. 09/305,234, filed May 4, 1999. 13 pages.
U.S. Office Action mailed May 21, 2003, for commonly owned U.S. Appl. No. 09/305,234, filed May 4, 1999. 6 pages.
Sep. 22, 2003 Amendment in Response to Office Action mailed May 21, 2003, for commonly owned U.S. Appl. No. 09/305,234, filed May 4, 1999. 10 pages.
Request for Continued Examination dated Oct. 21, 2003, for commonly owned U.S. Appl. No. 09/305,234, filed May 4, 1999. 2 pages.
Advisory Action mailed Oct. 28, 2003, for commonly owned U.S. Appl. No. 09/305,234, filed May 4, 1999. 2 pages.
U.S. Office Action mailed Nov. 17, 2003 for commonly owned U.S. Appl. No. 09/305,234, filed May 4, 1999. 5 pages.
Feb. 17, 2004 Response to Office Action mailed Nov. 17, 2003, for commonly owned U.S. Appl. No. 09/305,234, filed May 4, 1999. 11 pages.
U.S. Office Action mailed May 4, 2004, for commonly owned U.S. Appl. No. 09/305,234, filed May 4, 1999. 4 pages. 6 pages.
Jul. 6, 2004 Amendment in Response to Office Action mailed May 4, 2004, for commonly owned U.S. Appl. No. 09/305,234, filed May 4, 1999. 9 pages.
Advisory Action mailed Aug. 31, 2004, for commonly owned U.S. Appl. No. 09/305,234, filed May 4, 1999. 3 pages.
Request for Continued Examination and Amendment dated Sep. 7, 2004, for commonly owned U.S. Appl. No. 09/305,234, filed May 4, 1999. 10 pages.
Advisory Action mailed Sep. 14, 2004, for commonly owned U.S. Appl. No. 09/305,234, filed May 4, 1999. 3 pages.
U.S. Office Action mailed Nov. 3, 2004, for commonly owned U.S. Appl. No. 09/305,234, filed May 4, 1999. 6 pages.
May 5, 2005 Amendment and Response to Office Action mailed Nov. 3, 2004, for commonly owned U.S. Appl. No. 09/305,234, filed May 4, 1999. 13 pages.
Notice of Informal or Non-Responsive Amendment mailed Jul. 26, 2005, for commonly owned U.S. Appl. No. 09/305,234, filed May 4, 1999. 2 pages.
Aug. 24, 2005 Response to Office Action mailed Jul. 26, 2005, for commonly owned U.S. Appl. No. 09/305,234, filed May 4, 1999. 8 pages.
U.S. Office Action mailed Nov. 17, 2005, for commonly owned U.S. Appl. No. 09/305,234, filed May 4, 1999. 6 pages.
Jan. 17, 2006 Amendment after Final Rejection dated Nov. 17, 2005, for commonly owned U.S. Appl. No. 09/305,234, filed May 4, 1999. 14 pages.
Advisory Action mailed Feb. 9, 2006, for commonly owned U.S. Appl. No. 09/305,234, filed May 4, 1999. 3 pages.
Mar. 29, 2006 Second Response to Office Action dated Nov. 17, 2005, for commonly owned U.S. Appl. No. 09/305,234, filed May 4, 1999. 12 pages.
Examiner Interview Summary mailed Mar. 30, 2006, for commonly owned U.S. Appl. No. 09/305,234, filed May 4, 1999. 4 pages.
Ex Parte Quayle Action mailed Apr. 12, 2006, for commonly owned U.S. Appl. No. 09/305,234, filed May 4, 1999. 4 pages.
May 18, 2006 Amendment and Response to Ex Parte Quayle Action mailed Apr. 12, 2006, for commonly owned U.S. Appl. No. 09/305,234, filed May 4, 1999. 5 pages.
Notice of Informal or Non-Responsive Amendment mailed Jun. 1, 2006, for commonly owned U.S. Appl. No. 09/305,234, filed May 4, 1999. 2 pages.
Jun. 16, 2006 Response to Notice of Non-Compliant Amendment dated Jun. 1, 2006, for commonly owned U.S. Appl. No. 09/305,234, filed May 4, 1999. 4 pages.
Ex Parte Quayle mailed May 18, 2007, for commonly owned U.S. Appl. No. 09/305,234, filed May 4, 1999. 3 pages.
Jun. 25, 2007 Response to Ex Parte Quayle dated May 18, 2007, for commonly owned U.S. Appl. No. 09/305,234, filed May 4, 1999. 10 pages.
Notice of Allowance and Fees Due, mailed Jan. 10, 2008, for commonly owned U.S. Appl. No. 09/305,234. 4 pages.
Apr. 10, 2008 Request for Continued Examination, for commonly owned U.S. Appl. No. 09/305,234, filed May 4, 1999. 2 pages.
Notice of Allowance mailed Apr. 30, 2008, for commonly owned U.S. Appl. No. 09/305,234, filed May 4, 1999. 4 pages.
Issue Notification dated Jun. 25, 2008, for commonly owned U.S. Appl. No. 09/305,234, filed May 4, 1999. 1 page.
Jul. 3, 2008 Request for Continued Examination, for commonly owned U.S. Appl. No. 09/305,234, filed May 4, 1999. 2 pages.
Notice of Withdrawal from Issue mailed Jul. 8, 2008, for commonly owned U.S. Appl. No. 09/305,234, filed May 4, 1999. 1 page.
U.S. Office Action mailed Aug. 1, 2008, for commonly owned U.S. Appl. No. 09/305,234, filed May 4, 1999. 6 pages.
Examiner Interview Summary mailed Oct. 27, 2008, for commonly owned U.S. Appl. No. 09/305,234, filed May 4, 1999. 2 pages.
Dec. 1, 2008 Response to the Non-Final Office Action mailed Aug. 1, 2008, for commonly owned U.S. Appl. No. 09/305,234, filed May 4, 1999. Dated Dec. 1, 2008. 22 pages.
Examiner's Amendment mailed Aug. 12, 2009, for commonly owned U.S. Appl. No. 09/305,234, filed May 4, 1999. 7 pages.
Notice of Allowance mailed Sep. 3, 2009, for commonly owned U.S. Appl. No. 09/305,234, filed May 4, 1999. 10 pages.
U.S. Office Action mailed Mar. 9, 2001, for commonly owned U.S. Appl. No. 09/305,146, filed May 4, 1999. 5 pages.
Sep. 10, 2001 Amendment and Response to Office Action mailed Mar. 9, 2001, for commonly owned U.S. Appl. No. 09/305,146, filed May 4, 1999. 7 pages.
U.S. Office Action mailed Dec. 4, 2001, for commonly owned U.S. Appl. No. 09/305,146, filed May 4, 1999. 7 pages.
Preliminary Amendment dated Apr. 19, 2002, for commonly owned U.S. Appl. No. 09/305,146, filed May 4, 1999. 12 pages.
Continuing Prosecution Application (ACPA) dated Apr. 19, 2002, for commonly owned U.S. Appl. No. 09/305,146, filed May 4, 1999. 2 pages.
U.S. Office Action mailed May 6, 2002, for commonly owned U.S. Appl. No. 09/305,146, filed May 4, 1999. 6 pages.
Amendment dated Jul. 3, 2002, for commonly owned U.S. Appl. No. 09/305,146, filed May 4, 1999. 10 pages.
Advisory Action mailed Jul. 23, 2002, for commonly owned U.S. Appl. No. 09/305,146, filed May 4, 1999. 3 pages.

Request for Continued Examination and Amendment dated Oct. 7, 2002, for commonly owned U.S. Appl. No. 09/305,146, filed May 4, 1999. 14 pages.
Jan. 9, 2003 Supplemental Response and Request for Continued Examination, for commonly owned U.S. Appl. No. 09/305,146, filed May 4, 1999. 14 pages.
Jan. 17, 2003 Request for Corrected RCE Filing, for commonly owned U.S. Appl. No. 09/305,146, filed May 4, 1999. 5 pages.
U.S. Office Action mailed Mar. 18, 2003, for commonly owned U.S. Appl. No. 09/305,146, filed May 4, 1999. 6 pages.
Amendment dated Jun. 17, 2003, for commonly owned U.S. Appl. No. 09/305,146, filed May 4, 1999. 7 pages.
U.S. Office Action mailed Nov. 13, 2003, for commonly owned U.S. Appl. No. 09/305,146, filed May 4, 1999. 6 pages.
Proposed Amendment for RCE for personal Interview on Feb. 3, 2004 dated Jan. 29, 2004, for commonly owned U.S. Appl. No. 09/305,146, filed May 4, 1999. 8 pages.
Interview Summary dated Feb. 3, 2004, for commonly owned U.S. Appl. No. 09/305,146, filed May 4, 1999. 2 pages.
Amendment dated Feb. 13, 2004, for commonly owned U.S. Appl. No. 09/305,146, filed May 4, 1999. 7 pages.
Request for Continued Examination dated Feb. 13, 2004, for commonly owned U.S. Appl. No. 09/305,146, filed May 4, 1999. 2 pages.
U.S. Office Action mailed May 20, 2004, for commonly owned U.S. Appl. No. 09/305,146, filed May 4, 1999. 6 pages.
Amendment dated Aug. 20, 2004, for commonly owned U.S. Appl. No. 09/305,146, filed May 4, 1999. 11 pages.
U.S. Office Action mailed Jan. 21, 2005, for commonly owned U.S. Appl. No. 09/305,146, filed May 4, 1999. 7 pages.
Mar. 21, 2005 Amendment and Response to Office Action mailed Jan. 21, 2005, for commonly owned U.S. Appl. No. 09/305,146, filed May 4, 1999. 11 pages.
Advisory Action mailed Apr. 28, 2005, for commonly owned U.S. Appl. No. 09/305,146, filed May 4, 1999. 3 pages.
Request for Continued Examination dated May 31, 2005, for commonly owned U.S. Appl. No. 09/305,146, filed May 4, 1999. 2 pages.
Amendment dated May 31, 2005, for commonly owned U.S. Appl. No. 09/305,146, filed May 4, 1999. 11 pages.
U.S. Office Action mailed Aug. 23, 2005, for commonly owned U.S. Appl. No. 09/305,146, filed May 4, 1999. 5 pages.
Amendment dated Nov. 22, 2005, for commonly owned U.S. Appl. No. 09/305,146, filed May 4, 1999. 14 pages.
U.S. Office Action mailed Feb. 24, 2006, for commonly owned U.S. Appl. No. 09/305,146, filed May 4, 1999. 7 pages.
Pre-Appeal Brief Request for Review dated Apr. 24, 2006, for commonly owned U.S. Appl. No. 09/305,146, filed May 4, 1999. 5 pages.
Notice of Appeal dated Apr. 24, 2006, for commonly owned U.S. Appl. No. 09/305,146, filed May 4, 1999. 1 page.
Appeal Brief dated Jul. 24, 2006, for commonly owned U.S. Appl. No. 09/305,146, filed May 4, 1999. 28 pages.
Notification of Non-Compliant Appeal Brief mailed Oct. 13, 2006, for commonly owned U.S. Appl. No. 09/305,146, filed May 4, 1999. 2 pages.
Response to Notification of Non-Compliant Appeal Brief dated Nov. 13, 2006, for commonly owned U.S. Appl. No. 09/305,146, filed May 4, 1999. 2 pages.
Amended Appeal Brief dated Nov. 13, 2006, for commonly owned U.S. Appl. No. 09/305,146, filed May 4, 1999. 30 pages.
Notification of Non-Compliant Appeal Brief mailed Mar. 9, 2007, for commonly owned U.S. Appl. No. 09/305,146, filed May 4, 1999. 2 pages.
Response to Notification of Non-Compliant Appeal Brief dated Mar. 28, 2007, for commonly owned U.S. Appl. No. 09/305,146, filed May 4, 1999. 7 pages.
Examiner's Answer mailed Jul. 30, 2007, for commonly owned U.S. Appl. No. 09/305,146, filed May 4, 1999. 11 pages.
Reply Brief dated Oct. 1, 2007, for commonly owned U.S. Appl. No. 09/305,146, filed May 4, 1999. 12 pages.
Reply Brief noted by Examiner mailed Dec. 17, 2007, for commonly owned U.S. Appl. No. 09/305,146, filed May 4, 1999. 3 pages.
Decision of the Board of Patent Appeals and Interferences mailed Jun. 9, 2009, for commonly owned U.S. Appl. No. 09/305,146, 14 pages.

Notice of Allowance mailed Sep. 2, 2009, for commonly owned U.S. Appl. No. 09/305,146, filed May 4, 1999. 5 pages.
Request for Continued Examination dated Sep. 3, 2009, for commonly owned U.S. Appl. No. 09/305,146, filed May 4, 1999. 4 pages.
Notice of Allowance mailed Nov. 3, 2009, for commonly owned U.S. Appl. No. 09/305,146, filed May 4, 1999. 4 pages.
Request for Continued Examination dated Feb. 2, 2010, for commonly owned U.S. Appl. No. 09/305,146, filed May 4, 1999. 4 pages.
Notice of Allowance mailed Apr. 4, 2010, for commonly owned U.S. Appl. No. 09/305,146, filed May 4, 1999. 4 pages.
Request for Continued Examination dated Jul. 1, 2010, for commonly owned U.S. Appl. No. 09/305,146, filed May 4, 1999. 2 pages.
Notice of Allowance mailed Jul. 15, 2010, for commonly owned U.S. Appl. No. 09/305,146, filed May 4, 1999. 4 pages.
Request for Continued Examination dated Oct. 14, 2010, for commonly owned U.S. Appl. No. 09/305,146, filed May 4, 1999. 2 pages.
Notice of Allowance issued Oct. 19, 2010, for commonly owned U.S. Appl. No. 09/305,146, filed May 4, 1999. 4 pages.
Issue Fee Payment dated Nov. 22, 2010, for commonly owned U.S. Appl. No. 09/305,146, filed May 4, 1999. 1 page.
Preliminary Amendment filed Dec. 20, 2004, for commonly owned U.S. Appl. No. 11/017,086, filed Dec. 20, 2004. 9 pages.
U.S. Office Action mailed Sep. 23, 2005, for commonly owned U.S. Appl. No. 11/017,086, filed Dec. 20, 2004. 22 pages.
Jan. 23, 2006 Response to Office Action dated Sep. 23, 2005, for commonly owned U.S. Appl. No. 11/017,086, filed Dec. 20, 2004. 19 pages.
U.S. Office Action mailed Apr. 18, 2006, for commonly owned U.S. Appl. No. 11/017,086, filed Dec. 20, 2004. 24 pages.
Notice of Appeal filed Sep. 15, 2006, for commonly owned U.S. Appl. No. 11/017,086, filed Dec. 20, 2004. 1 page.
Feb. 14, 2007 Amendment and Request for Continued Examination, for commonly owned U.S. Appl. No. 11/017,086, filed Dec. 20, 2004. 18 pages.
U.S. Office Action mailed Mar. 22, 2007, for commonly owned U.S. Appl. No. 11/017,086, filed Dec. 20, 2004. 21 pages.
Aug. 17, 2007 Response to U.S. Office Action dated Mar. 22, 2007, for commonly owned U.S. Appl. No. 11/017,086, filed Dec. 20, 2004. 16 pages.
Office Action, mailed Nov. 5, 2007, for commonly owned U.S. Appl. No. 11/017,086. 23 pages.
Request for Continued Examination dated May 2, 2008, for commonly owned U.S. Appl. No. 11/017,086, filed Dec. 20, 2004. 2 pages.
Office Action mailed Aug. 11, 2008, for commonly owned U.S. Appl. No. 11/017,086, filed Dec. 20, 2004. 23 pages.
Jan. 8, 2009 Response to the final Office Action of Aug. 11, 2008, for commonly owned U.S. Appl. No. 11/017,086, filed Dec. 20, 2004. 17 pages.
Advisory Action mailed Feb. 2, 2009, for commonly owned U.S. Appl. No. 11/017,086, filed Dec. 20, 2004. 2 pages.
Request for Continued Examination dated Feb. 10, 2009, for commonly owned U.S. Appl. No. 11/017,086, filed Dec. 20, 2004. 2 pages.
U.S. Office Action mailed Mar. 3, 2009, for commonly owned U.S. Appl. No. 11/017,086, filed Dec. 20, 2004. 26 pages.
USPTO Communication mailed Mar. 12, 2009, for commonly owned U.S. Appl. No. 11/017,086, filed Dec. 20, 2004. 2 pages.
U.S. Office Action mailed Jul. 21, 2009, for commonly owned U.S. Appl. No. 11/017,086, filed Dec. 20, 2004. 25 pages.
Notice of Abandonment mailed Mar. 24, 2010, for commonly owned U.S. Appl. No. 11/017,086, filed Dec. 20, 2004. 3 pages.
Preliminary Amendment dated Jan. 21, 2010, for commonly owned U.S. Appl. No. 12/691,515, filed Jan. 21, 2010. 3 pages.
U.S. Office Action mailed on Nov. 9, 2010, for commonly owned U.S. Appl. No. 12/691,515, filed Jan. 21, 2010. 10 pages.
U.S. Patent 7,013,264 Re-Examination Request U.S. Appl. No. 90/010,201, filed Jun. 19, 2008. 128 pages.
Determination of Reexam mailed Aug. 1, 2008, for commonly owned U.S. Reexamination No. 90/010,201, filed Jun. 19, 2008. 12 pages.
U.S. Office Action mailed Jul. 17, 2009, for commonly owned U.S. Reexamination No. 90/010,201, filed Jun. 19, 2008. 28 pages.

Sep. 17, 2009 Response to Office Action mailed Jul. 17, 2009, for commonly owned U.S. Reexamination No. 90/010,201, filed Jun. 19, 2008. 49 pages.
Examiner Interview Summary Record dated Sep. 17, 2009, for commonly owned U.S. Reexamination No. 90/010,201, filed Jun. 19, 2008. 201 pages.
Sep. 17, 2009 Affidavits, Declarations, and/or Exhibits filed, for commonly owned U.S. Reexamination No. 90/010,201, filed Jun. 19, 2008. 201 pages.
Decision Merging Proceedings Granted, mailed Feb. 26, 2010, for commonly owned U.S. Reexamination No. 90/010,201 filed Jun. 19, 2008. 3 pages.
Mar. 26, 2010 Amendment and Response to Office Action dated Feb. 26, 2010, for commonly owned U.S. Reexamination No. 90/010,201 filed Jun. 19, 2008. 11 pages.
Decision Merging Proceedings Granted, mailed Feb. 26, 2010, for commonly owned U.S. Reexamination No. 90/010,713 filed Oct. 9, 2009. 3 pages.
Mar. 26, 2010 Amendment in response to Notice to Merge Reexamination dated Feb. 26, 2010, for commonly owned U.S. Reexamination No. 90/010,713 filed Oct. 9, 2009. 11 pages.
Examiner Interview Summary Record dated Jul. 13, 2010, for merged Reexamination Nos. 90/010,201 and 90/010,713 regarding commonly owned U.S. Patent No. 7,013,284 (41 pages).
Patent Owner's Statement of the Interview Under 37 C.F.R. 1.560(b) dated Jul. 30, 2010 for merged Reexamination Nos. 90/010,201 and 90/010,713 regarding commonly owned U.S. Patent No. 7,013,284 (17 pages).
Supplemental Response dated Aug. 27, 2010, for merged Reexamination Nos. 90/010,201 and 90/010,713 regarding commonly owned U.S. Patent No. 7,013,284 (63 pages).
U.S. Office Action mailed Oct. 1, 2010, for merged Reexamination Nos. 90/010,201 and 90/010,713 regarding commonly owned U.S. Patent No. 7,013,284. 40 pages.
Examiner Interview Summary mailed Dec. 15, 2010, for merged Reexamination Nos. 90/010,201 and 90/010,713 regarding commonly owned U.S. Patent No. 7,013,284. 56 pages.
Patent Owner's Response with Appendices dated Jan. 3, 2011, for merged Reexamination Nos. 90/010,201 and 90/010,713 regarding commonly owned U.S. Patent No. 7,013,284. 928 pages. (Document filed in 25 parts).
Dec. 16, 2009 Report on the Filing or Determination of an Action Regarding a Patent or Trademark, for commonly owned U.S. Appl. No. 09/305,234, filed May 4, 1999 and later assigned U.S. Appl. No. 90/010,735. 1 page.
Examiner Interview Summary mailed Dec. 15, 2010, for Reexamination No. 90/010,735 regarding commonly owned U.S. Patent No. 7,617,240. 6 pages.
Interview Summary dated Mar. 3, 2011 in Reexamination (Control No. 90/010,735) filed Nov. 10, 2009, for commonly owned U.S. Patent No. 7,617,240. 49 pages.
U.S. Patent 7,013,284 Re-Examination Request U.S. Appl. No. 90/011,484, filed Feb. 10, 2011. 90 pages.
Exhibit D—Archived description of the Diamond product from Applied Systems, published at least by Jul. 15, 1997, filed in U.S. Patent 7,013,284 Re-Examination Request U.S. Appl. No. 90/011,484, filed Feb. 10, 2011. 8 pages.
Exhibit I—Claim Interpretations, filed in U.S. Patent 7,013,284 Re-Examination Request U.S. Appl. No. 90/011,484, filed Feb. 10, 2011. 18 pages.
Exhibit J—Claims Charts for Claims 1-40 based on Flores and Abbruzzese under 35 U.S.C. § 103, filed in U.S. Patent 7,013,284 Re-Examination Request U.S. Appl. No. 90/011,484, filed Feb. 10, 2011. 207 pages.
Exhibit K—Claim Chart for Claims 1-40 based on Flores, Diamond and Abbruzzese under 35 U.S.C. § 103, filed in U.S. Patent 7,013,284 Re-Examination Request U.S. Appl. No. 90/011,484, filed Feb. 10, 2011. 186 pages.
Exhibit L—Claim Chart for Claims 1-40 based on Flores, Borghesi, and Abbruzzese under 35 U.S.C. § 103, filed in U.S. Patent 7,013,284 Re-Examination Request U.S. Appl. No. 90/011,484, filed Feb. 10, 2011. 181 pages.
Exhibit M—Claim Chart for Claims 1-40 based on Lynn and Abbruzzese under 35 U.S.C. § 103, filed in U.S. Patent 7,013,284 Re-Examination Request U.S. Appl. No. 90/011,484, filed Feb. 10, 2011. 138 pages.
Exhibit N—Claim Chart for Charts 1-40 based on Schutzman and Abbruzzese under 35 U.S.C. § 103, filed in U.S. Patent 7,013,284 Re-Examination Request U.S. Appl. No. 90/011,484, filed Feb. 10, 2011. 119 pages.
Exhibit O—Claim Chart for Charts 1-40 based on Caruso and Abbruzzese under 35 U.S.C. § 103, filed in U.S. Patent 7,013,284 Re-Examination Request U.S. Appl. No. 90/011,484, filed Feb. 10, 2011. 102 pages.
Exhibit P—Action Finishes 1995 with Strong December Sales, PR Newswire, Jan. 1996, filed in U.S. Patent 7,013,284 Re-Examination Request U.S. Appl. No. 90/011,484, filed Feb. 10, 2011. 3 pages.
Order Granting Re-Examination (Control No. 90/011,484) dated Mar. 4, 2011, for commonly owned U.S. Patent No. 7,013,284. 15 pages.
Notice of Allowance issued Feb. 7, 2011, for commonly owned U.S. Appl. No. 11/264,115, filed Nov. 1, 2005. 24 pages.
Notice of Allowance issued Mar. 7, 2011, for commonly owned U.S. Appl. No. 09/305,146. 5 pages.
Accenture Global Service's GmbH and Accenture LLP's Jan. 18, 2011 Response to Guidewire, Inc.'s Third Set of Interrogatories, in lawsuit asserting U.S. Patent No. 7,617,240, captioned *Accenture Global Services GmbH, et al. v. Guidewire Software, Inc.*, Dkt. 09cv848, D. Del. Nov. 10, 2009, 8 pages.
Defendant Guidewire Software, Inc.'s Feb. 28, 2011 Supplemental Objections and Response to Accenture's Interrogatory No. 4, in lawsuit asserting U.S. Patent No. 7,617,240, captioned *Accenture Global Services GmbH, et al. v. Guidewire Software, Inc.*, Dkt. 09cv848, D. Del. Nov. 10, 2009, No. 6., 6 pgs.
Accenture Global Services GmbH, and Accenture LLP's Supplemental Response to Interrogatories Nos. 7 and 8, dated Mar. 11, 2011, in lawsuit asserting U.S. Patent No. 7,617,240, captioned *Accenture Global Services GmbH, et al. v. Guidewire Software, Inc.*, Dkt. 09cv848, D. Del. Nov. 10, 2009, 15 pgs.
Exhibit F of Accenture Global Services GmbH, and Accenture LLP's Supplemental Response to Interrogatories Nos. 7 and 8—Rebuttal of Guidewire's Invalidity Assertions Against '240 Patent Based on Access 97, 22 pgs.
Exhibit G of Accenture Global Services GmbH, and Accenture LLP's Supplemental Response to Interrogatories Nos. 7 and 8—Rebuttal of Guidewire's Invalidity Assertions Against '240 Patent Based on '109 Patent (Flores), 22 pgs.
Exhibit H of Accenture Global Services GmbH, and Accenture LLP's Supplemental Response to Interrogatories Nos. 7 and 8—Rebuttal of Guidewire's Invalidity Assertions Against '240 Patent Based on '764 Patent (Schutzman), 27 pgs.
Exhibit J of Accenture Global Services GmbH, and Accenture LLP's Supplemental Response to Interrogatories Nos. 7 and 8—Rebuttal of Guidewire's Invalidity Assertions Against '240 Patent Based on '169 Patent (Borghesi), 27 pgs.
Exhibit K of Accenture Global Services GmbH, and Accenture LLP's Supplemental Response to Interrogatories Nos. 7 and 8—Rebuttal of Guidewire's Invalidity Assertions Against '240 Patent Based '247 Patent (Lau), 37 pgs.
Exhibit L of Accenture Global Services GmbH, and Accenture LLP's Supplemental Response to Interrogatories Nos. 7 and 8—Rebuttal of Guidewire's Invalidity Assertions Against '240 Patent Based on '740 Patent (Lynn), 27 pgs.
Exhibit M of Accenture Global Services GmbH, and Accenture LLP's Supplemental Response to Interrogatories Nos. 7 and 8—Rebuttal of Guidewire's Invalidity Assertions Against '240 Patent Based on '271 Patent (Caruso), 33 pgs.
Exhibit N of Accenture Global Services GmbH, and Accenture LLP's Supplemental Response to Interrogatories Nos. 7 and 8—Rebuttal of Guidewire's Invalidity Assertions Against '240 Patent Based on Agarwal, 22 pgs.
Defendant Guidewire Software, Inc.'s Mar. 29, 2011 Supplemental Objections and Response to Accenture's Interrogatory No. 3, in lawsuit asserting U.S. Patent No. 7,617,240, captioned *Accenture*

*Global Services GmbH, et al.* v. *Guidewire Software, Inc.*, Dkt. 09cv848, D. Del. Nov. 10, 2009, No. 6., 24 pgs.
Exhibit C of Defendant Guidewire Software, Inc.'s Mar. 29, 2011 Redacted Supplemental Objections and Response to Accenture's Interrogatory No. 3 (F623) (Microsoft TODD, as cited in Mar. 14, 2001 and Dec. 3, 2001 Office Actions in 284 Patent File History)—Guidewire Invalidity Contentions Invalidity Claim Chart for '240 Patent, 19 pages.
Exhibit F of Defendant Guidewire Software, Inc.'s Mar. 29, 2011 Redacted Supplemental Objections and Response to Accenture's Interrogatory No. 3 (F623) (Microsoft Access 97)—Guidewire Invalidity Contentions Invalidity Claim Chart for '240 Patent, 15 pages.
Exhibit G of Defendant Guidewire Software, Inc.'s Mar. 29, 2011 Redacted Supplemental Objections and Response to Accenture's Interrogatory No. 3 (F623) ('109 Patent (Flores))—Guidewire Invalidity Contentions Invalidity Claim Chart for '240 Patent, 42 pages.
Exhibit H of Defendant Guidewire Software, Inc.'s Mar. 29, 2011 Redacted Supplemental Objections and Response to Accenture's Interrogatory No. 3 (F623) ('764 Patent (Shutzman)—Guidewire Invalidity Contentions Invalidity Claim Chart for '240 Patent, 73 pages.
Exhibit J of Defendant Guidewire Software, Inc.'s Mar. 29, 2011 Redacted Supplemental Objections and Response to Accenture's Interrogatory No. 3 (F623) ('169 Patent (Borgheshi)—Guidewire Invalidity Contentions Invalidity Claim Chart for '240 Patent, 39 pages.
Exhibit K of Defendant Guidewire Software, Inc.'s Mar. 29, 2011 Redacted Supplemental Objections and Response to Accenture's Interrogatory No. 3 (F623) ('247 Patent (Lau))—Guidewire Invalidity Contentions Invalidity Claim Chart for '240 Patent, 25 pages.
Exhibit L of Defendant Guidewire Software, Inc.'s Mar. 29, 2011 Redacted Supplemental Objections and Response to Accenture's Interrogatory No. 3 (F623) ('740 Patent (Lynn)—Guidewire Invalidity Contentions Invalidity Claim Chart for '240 Patent, 44 pages.
Exhibit M of Defendant Guidewire Software, Inc.'s Mar. 29, 2011 Redacted Supplemental Objections and Response to Accenture's Interrogatory No. 3 (F623) (271 Patent (Caruso))—Guidewire Invalidity Contentions Invalidity Claim Chart for '240 Patent, 39 pages.
Exhibit O of Defendant Guidewire Software, Inc.'s Mar. 29, 2011 Redacted Supplemental Objections and Response to Accenture's Interrogatory No. 3 (F623) (Project Salsa)—Guidewire Invalidity Contentions Invalidity Claim Chart for '240 Patent, 44 pages.
Accenture Global Services GmbH, Accenture LLP's and Guidewire Software, Inc.'s Joint Claim Construction Statement (Dkt #183) and Joint Claim Construction Chart—Exhibit A (Dkt #184) filed Apr. 11, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009, 6 pages.
Accenture's Opening Claim Construction Brief, filed Apr. 25, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 22 pages.
Office Action dated Jan. 24, 2007, for commonly owned U.S. Appl. No. 10/434,827, filed May 9, 2003. 40 pages.
Office Action dated May 31, 2007, for commonly owned U.S. Appl. No. 10/434,827, filed May 9, 2003. 20 pages.
May 6, 2011 Response to Non-Final Office Action dated Nov. 9, 2010, for commonly owned U.S. Appl. No. 12/691,515, filed Jan. 21, 2010. 6 pages.
Patent Owner's Petition to Expunge the Request for Reexamination and Vacate the Filing Date and Order Granting Reexamination dated May 4, 2011, for Reexamination No. 90/011,484 regarding commonly owned U.S. Patent No. 7,013,284. 6 pages.
Muth et al., "Integrating Light-Weight Workflow Management Systems within Existing Business Environments", Proceedings, 15th International Conference on Data Engineering Mar. 23-26, 1999. 8 pages.
Patent Owner's Response with Appendices dated May 4, 2011, for Reexamination No. 90/010,735 regarding commonly owned U.S. Patent No. 7,617,240. 55 pages.
Appendix AA—Declaration of John A. Pierce dated May 3, 2011, and Accompanying exhibits, filed with Patent Owner's Response of May 4, 2011, in Reexamination No. 90/010,735 regarding commonly owned U.S. Patent No. 7,617,240. 8 pages.
Appendix BB—Therese Rutkowski, "Keeping the Promise: Insurance Network News Executive Strategies for Technology Management" Feb. 1, 2002, filed with Patent Owner's Response of May 4, 2011, in Reexamination No. 90/010,735 regarding commonly owned U.S. Patent No. 7,617,240. 3 pages.
Appendix CC—"Affirmative Insurance Selects Accenture Claims Solution for Its Transformation Program" Sep. 13, 2007, filed with Patent Owner's Response of May 4, 2011, in Reexamination No. 90/010,735 regarding commonly owned U.S. Patent No. 7,617,240. 4 pages.
Appendix DD—"Accenture Claim Components Solution Version 6.0 Implemented At OneBeacon" Jul. 10, 2007, filed with Patent Owner's Response of May 4, 2011, in Reexamination No. 90/010,735 regarding commonly owned U.S. Patent No. 7,617,240. 4 pages.
Apendix EE—"Kemper Insurance Selects Accenture's Claim Components Software" May 14, 2002, filed with Patent Owner's Response of May 4, 2001, in Reexamination No. 90/010,735 regarding commonly owned U.S. Patent No. 7,617,240. 4 pages.
Appendix Z—Celent, "Claim Systems Vendors: North American P/C Insurance 2011" Jan. 2011, filed with Patent Owner's Response of May 4, 2001, in Reexamination No. 90/010,735 regarding commonly owned U.S. Patent No. 7,617,240. 143 pages.
Memorandum Opinion filed May 31, 2011, in lawsuit asserting U.S. Patent No. 7,013,284 B2, captioned *Accenture Global Services GmbH, et al.* v. *Guidewire Software, Inc.*, Case No. 07cv826, D. Del. Dec. 18, 2007. 18 pages. Dkt. No. 527.
Guidewire's Answering Claim Construction Brief filed May 27, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 25 pages. Dkt. No. 207.
Declaration of Clement S. Roberts in Support of Guidewire Inc.'s Answering Claim Construction Brief filed May 27, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 3 pages. Dkt. No. 208.
Exhibit 3—Accenture Newsroom, "Accenture Unveils Enhanced Property and Casualty Insurance Software Platforms", http://newsroom.accenture.com/article_display.cfm?article_id=5212, in Support of Guidewire Inc.'s Answering Claim Construction Brief filed May 27, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 4 pages. Dkt. No. 208-1.
Exhibit 4—"Segment" definition, http://www.merriam-webster.com/dictionary/segment, in Support of Guidewire Inc.'s Answering Claim Construction Brief filed May 27, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 3 pages. Dkt. No. 208-1.
Diamond Personal Auto, Applied Systems, Date Unknown. Deposition Exhibit 123, 12 pages.
The Diamond System—Overview and Features. http://web.archive.org/web/19981201192832/www.appliedsystems.com/Diamond/overview.html. Printed from the Internet May 31, 2009. Deposition Exhibit 141, p. 1.
Freedom's Claim Station, The Freedom Group, 1999. Deposition Exhibit 151, 14 pages.
"The Claims Workstation", The Freedom Group, 1997. Deposition Exhibit 154, 4 pages.
"AAA Missouri Implements Claims Management System", Case Study—The Freedom Group, 1998. Deposition Exhibit 156. 2 pages.
"Higher Customer Satisfaction. Lower Leakage. With Freedom's Claims Workstation." The Freedom Group, 1998. Deposition Exhibit 157, 4 pages.
Fawley, "Arbella Mutual Insurance Company Adds Freedom's Claims Workstation", The Freedom Group, Apr. 2, 1998. Deposition Exhibit 158, 2 pages.
Fawley, "Permanent General Assurance Corporation Adds Freedom's Claims Workstation", The Freedom Group, Dec. 29, 1998. Deposition Exhibit 159, 2 pages.

"AAA Missouri Implements Claims Management System", Date Unknown. Deposition Exhibit 160, 1 page.

Fawley, "The Concord Group Insurance Companies Go 'Live' with Freedom's Claims WorkStation", The Freedom Group, Feb. 1, 1999. Deposition Exhibit 161, 2 pages.

"Claims Workstation", USPTO Trademark Electronic Search System (TESS), printed from United States Patent and Trademark Office website Apr. 10, 2009. Deposition Exhibit 163, 2 pages.

Publically available documents taken from the Internet Archive on the Diamond System—http://web.archive.org/web/19970619183517/www.appliedsystems.com/compsys.htm, circa 1997, 12 pages.

Publically available documents taken from the Internet Archive on the Claims Workstation—web.archive.org/web/19971008183730/www.freedomgroup.com/tfgclmws.htm, circa 1997, 3 pages.

Publically available documents taken from the Internet Archive on the Pyramid—web.archive.org/web/19981212032130/http://www.pyramidservices.com, circa 1998, 37 pages.

Advisory Action issued May 27, 2011, for Reexamination No. 90/010,735 regarding commonly owned U.S. Patent No. 7,617,240. 4 pages.

Stipulation and Order of Partial Dismissal filed Jun. 17, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 4 pages. Dkt. No. 219.

Final Judgment filed Jun. 22, 2011, in lawsuit asserting U.S. Patent No. 7,617,240, captioned *Accenture Global Services GmbH, et al.* v. *Guidewire Software, Inc.*, Case No. 09cv848, D. Del. Nov. 10, 2009. 1 page. Dkt. No. 221.

Issue Notification mailed Jun. 22, 2011, for commonly owned U.S. Appl. No. 09/305,146. 1 page.

Office Action, dated Nov. 9, 2012, pp. 1-27, U.S. Appl. No. 12/036,119, U.S. Patent and Trademark Office, Virginia.

Office Action, dated Mar. 27, 2012, pp. 1-32, U.S. Appl. No. 12/036,119, U.S. Patent and Trademark Office, Virginia.

Office Action, dated Nov. 23, 2012, pp. 1-10, U.S. Appl. No. 12/036,115, U.S. Patent and Trademark Office, Virginia.

Office Action, dated Jan. 15, 2013, pp. 1-13, U.S. Appl. No. 12/036,120, U.S. Patent and Trademark Office, Virginia.

* cited by examiner

Question Details

| | |
|---|---|
| Question Name: | WereThereAnyWitnesses |
| Question Number: | KF001 |
| Application: | FNOL |
| Data Type: | Code |
| Page Display: | Single |
| Storage Type: | Answer |
| Activation Date: | 01/01/1800 |
| Answer Only: | ☐ |
| Integration: | Not Applicable |
| Integration Service: | |
| Application Change Required: | ☐ |
| Expiration Date: | 12/31/2999 |

Tabs: Details | Question Text | Answers | Summary

Buttons: Add New (302), Create Like (304), Expire (306), Add to Container (308), Edit, Back

Details

| | |
|---|---|
| Question Name: | |
| Question Number: | KF001 |
| Application: | FNOL * |
| Data Type: | <None> * |
| Page Display: | <None> * |
| Storage Type: | <None> * |
| Activation Date: | 10/26/2006 ◇ * |
| Answer Only: | ☐ |
| Integration: | Not Applicable ▶ |
| Integration Service: | |
| Application Change Required: | <No> ▶ |
| Expiration Date: | 12/31/2999 ◇ * |

Tabs: Details | Question Text | Answers | Summary

Buttons: Back | Reset | Save

| Details | Question Text | Answers | Summary |

Data Type: Boolean    Control Type: Checkbox

Save Properties

Required for Save: [No ▶]

Required for Page Complete: [No ▶]

Prompt User to Save: [Yes ▶]

Field Properties

Column Width: [ ]

Read Only: [No ▶]

Advanced Properties

Dependant Display Section: [ ]

Refresh: [No ▶]

[Back]  [Reset]  [Save]

| Details | Question Text | Answers | Summary |

Data Type: Currency   Control Type: TextBoxCurrency

Save Properties

- Required for Save: No ▶
- Required for Page Complete: No ▶
- Prompt User to Save: Yes ▶

Field Properties

- Column Width: ☐
- Currency UOM: USD ▶
- Decimal Places: ☐
- Maximum Length: ☐
- Minimum Length: ☐
- Maximum Value: ☐
- Minimum Value: ☐
- Default Value: ☐
- Read Only: No ▶

[Back] [Reset] [Save]

Figure 8

| Details | Question Text | Answers | Summary |

Data Type: Date          Control Type: CheckBoxDate

Save Properties

Required for Save: [No ▶]

Required for Page Complete: [No ▶]

Prompt User to Save: [Yes ▶]

Field Properties

Column Width: [　]

Read Only: [No ▶]

Advanced Properties

Refresh: [No ▶]

[Back]  [Reset]  [Save]

Figure 9

| Details | Question Text | Answers | Summary |

Data Type: Double  Control Type: TextBoxDouble

Save Properties

Required for Save: No ▶
Required for Page Complete: No ▶
Prompt User to Save: Yes ▶

Field Properties

Column Width:
Decimal Places:
Maximum Length:
Minimum Length:
Maximum Value:
Minimum Value:
Default Value:
Read Only: No ▶

Save
Reset
Back

| Details | Question Text | Answers | Summary |

Data Type: Hyperlink     Control Type: Link

Advanced Properties

Web Address: [          ]

Align Left: [No ▶]

[Back] [Reset] [Save]

| Details | Question Text | Answers | Summary |

Data Type: Number  Control Type: TextBoxInteger

Save Properties

Required for Save: [No ▶]

Required for Page Complete: [No ▶]

Prompt User to Save: [Yes ▶]

Field Properties

Column Width: [ ]

Maximum Length: [ ]

Minimum Length: [ ]

Maximum Value: [ ]

Minimum Value: [ ]

Default Value: [ ]

Read Only: [No ▶]

[Back] [Reset] [Save]

| Details | Question Text | Answers | Summary |

Data Type: Time    Control Type: TextBoxTime

Save Properties

Required for Save: [No ▶]

Required for Page Complete: [No ▶]

Prompt User to Save: [Yes ▶]

Field Properties

Column Width: [ ]

Read Only: [No ▶]

Advanced Properties

Refresh: [No ▶]

[Back] [Reset] [Save]

Figure 14

Save Properties

Required for Save: No ▶

Required for Page Complete: No ▶

Prompt User to Save: Yes ▶

Code Properties

Display Category:

Display Length: Long Decode ▶

Display Order: Code Sort Order ▶

Filtering Category:

Filtering Code: Select

Enable Default: No ▶

Default Value: <Not Answered> ▶

Field Properties

Read Only: No ▶

Advanced Properties

Refresh: No ▶

| Details | Question Text | Answers | Summary |

Answers

Data Type Code Value          Control Type ComboBoxCode

Save Properties

Required for Save          No
Required for Page Complete  No
Prompt User to Save         Yes

Code Properties

Display Category    ISO STATES
Display Length      LongDecode
Display Order       SortOrder
Filtering Category  ISO Countries
Filtering Code      US
Enable Default      Yes
Defauly Value       <None>

Field Properties

Column Width   45
Read Only      No

Advanced Properties

Dependant Display Section   ?
Refresh                     Yes

[Add New] [Create Like] [Add to Container] [Delete] [Edit]

| Details | Question Text | Answers | Summary |

Question Text: Were there any witnesses?

Question Containers

| Container Name: | Page Name: | Application: |
|---|---|---|
| gcKeyFacts | KEYFACTS | FNOL |

Rules

| Rule Name: | Rule Type: | Application: |
|---|---|---|
| WereThereAnyWittnesses_Yes_Rule | Page Display Rule | FNOL |
| RULE QUES KF 32 | Page Display Rule | FNOL |
| RULE DIS 017 | Evaluative Discrepancy Report Rule | FNOL |
| RULE DIS 018 | Evaluative Discrepancy Report Rule | FNOL |
| RULE DIS 026 | Node result Discrepancy Report Rule | FNOL |

[Reset] [Cancel] [Save]

Figure 18

CONVERSATIONAL QUESTION GENERATION SYSTEM ADAPTED FOR AN INSURANCE CLAIM PROCESSING SYSTEM

The following co-pending and commonly assigned U.S. patent applications have been filed on the same date as the present application: U.S. patent application Ser. No. 12/036,115, "A Rule Generation System Adapted for an Insurance Claim Processing System," filed herewith, U.S. patent application Ser. No. 12/036,119, "Container Generation System for a Customizable Application," filed herewith, and U.S. patent application Ser. No. 12/036,120, "Page Navigation Generation System for a Customizable Application", filed herewith, all of which are herein incorporated by reference.

BACKGROUND

1. Technical Field

This application relates to processing insurance claims, and in particular, to a conversational question generation system for an insurance claim processing computer system.

2. Related Art

In processing insurance claims from an insurance customer, an insurance claim agent typically asks a variety of questions to the insurance customer. An insurance claim processing center typically employs an insurance claim processing computer system for processing insurance claims from insurance customers. The insurance claim processing computer system may be used by various employees at the claim processing center such as insurance claim agents. The insurance claim processing computer system may be configured to display various graphical user interfaces that an insurance claim agent uses when asking questions to an insurance customer and when the insurance claim agent receives answers to those questions.

In some circumstances, the insurance claim processing center desires to change various graphical user interfaces. However, an insurance claim processing computer system is usually extremely complex and requires an individual, such as a computer program developer, who has a skill set that includes the computer programming language in which the insurance claim processing computer system was written. Hence, the insurance claim processing center incurs additional burdens, including fees to the computer program developer and lag time, each time the insurance claim processing center desires to change the graphical user interfaces. In addition, when an insurance claim processing center does not have the personnel with the technical skill set to add or create questions using the insurance claim processing computer system, the insurance claim processing center realizes additional expenses in training or hiring the personnel with the requisite skill set.

Moreover, making modifications to existing insurance claim processing computer systems requires disabling access to and shutting down the systems connected to the insurance claim processing computer system. Hence, when the insurance claim processing center desires to change the graphical user interfaces, the insurance claim processing center must shut down the entire insurance claim processing computer system to add the question. This shutting down process results in downtime of the insurance claim processing center, which translates into lost revenue and lost worker productivity.

Accordingly, there is a need in the industry for a system that facilitates the dynamic generation of conversational questions to an insurance claim processing computer system.

SUMMARY

A conversational question generation system dynamically generates conversational questions for an insurance claim processing computer system. The conversational questions may be used as part of an insurance claim processing computer system and presented on a graphical user interface or other communication interface. The conversational question generation system includes various modules and graphical user interfaces that provide a streamlined mechanism for creating new conversational questions or modifying pre-existing conversational questions for the insurance claim processing computer system. In addition, the conversational question generation system minimizes the need to learn a complicated computer language or syntax each time a conversational question is created. The conversational question generation system may include various levels of usability that distinguish between a question programmer of the conversational question generation system and an insurance claim agent that uses the created conversational questions.

A conversational question may have different parameters. For example, a conversational question may have question detail parameters, answer detail parameters, question text parameters, or other parameters. In generating conversational questions, the conversational question generation system may include graphical user interfaces directed to these various parameters.

In one implementation, the conversational question generation system includes a memory storage device in communication with various system components, such as a processor. The memory storage device stores a question database schema and a set of executable instructions that are executable by the processor. The question database schema defines the conversational question for display, and the question database schema is divided into additional database schemas. For example, the question database schema may include a question detail database schema, a question text database schema, or other additional database schemas.

The executable instructions may define multiple graphical user interfaces for display to an insurance claim agent or other user. In some implementations, the various graphical user interfaces are connected such that a question and answer session between an insurance claim agent and an insurance customer follows a logical progression based on the answers the insurance claim agent receives.

In one implementation, the graphical user interfaces include a question detail parameter module, a question text module, and an answer detail parameter module. The values received by the graphical user interfaces may be passed to a question generation module that uses the received values to generate the conversational question. The generated conversational question may be represented by the entries of the question detail database schema and the entries of the question text database schema.

While the embodiments described herein relate to insurance claim processing, the modules and other systems described may be adopted for any system that uses databases, Internet technologies, or graphical user interfaces.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 3 shows one example of a viewing mode graphical user interface implemented by the question detail parameter module of FIG. 2.

FIG. 4 shows one example of an edit mode graphical user interface implemented by the question detail parameter module of FIG. 2.

FIGS. 6-15 show various answer detail graphical user interfaces based on a received answer data type parameter value.

FIG. 17 shows one example of a code value answer detail graphical user interface.

FIG. 18 shows one example of a conversational question summary graphical user interface.

DETAILED DESCRIPTION

Figure 1:
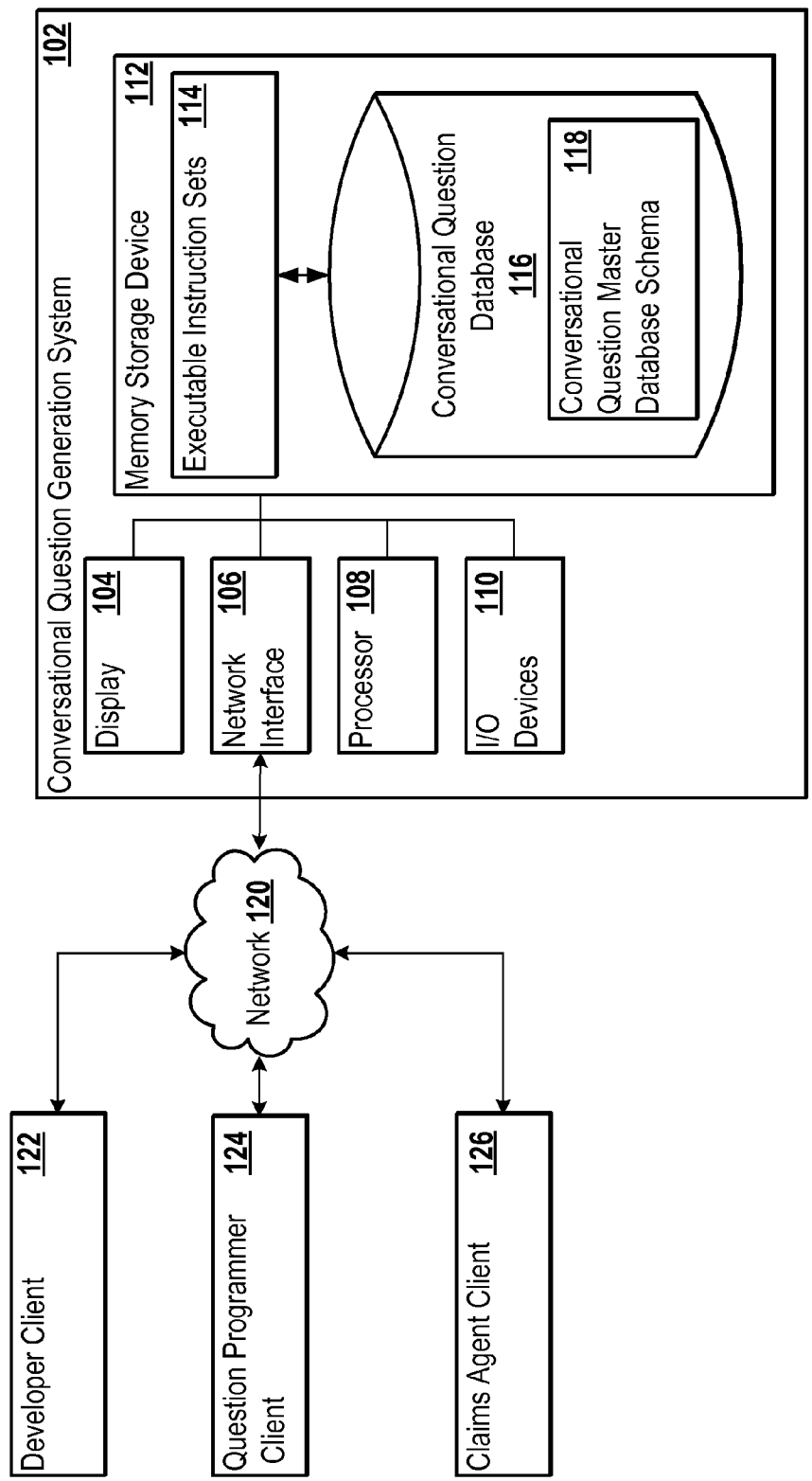
FIG. 1 shows one example of a conversational question generation system.

FIG. 1 shows an example of a conversational question generation system 102. The conversational question generation system 102 includes several components for generating conversational questions. In one implementation, the conversational question generation system 102 includes a display 104, a network interface 106, a processor 108, and various input/output devices 110, such as keyboards, mice, hard drives, floppy drives, optical disk drives, or other input/output devices. The conversational question generation system 102 also includes a memory storage device 112 that stores executable instruction sets 114 that are executable by the processor 108. The memory storage device 112 also stores a conversational question database 116 that implements a conversational question master database schema 118, which defines a conversational question for display.

The conversational question generation system 102 may generate many different types of conversational questions. In one implementation, the conversational question generation system 102 generates different types of conversational questions. The conversational questions may capture data from a graphical user interface, such as an internet browser, or from an integration interface. Other questions may allow a user, such as an employee of the insurance claim processing center, to navigate through the insurance claim processing computer system or to an external Internet web site. Another question type may display static question text to a user. Table 1 identifies examples of the types of questions that the user may create and the questions corresponding control type. In general, a control type corresponds to the data type of the displayed conversational question.

TABLE 1

| Type of Question | Control Rendered At Run Time | Data Capture |
|---|---|---|
| Short Answer | Question text Box | Y |
| Date | Text Box Date | Y |
| Number | Question text Box Integer | Y |
| Numeric | Question text Box Double | Y |
| Currency | Question text Box Currency + Combobox | Y |

TABLE 1-continued

| Type of Question | Control Rendered At Run Time | Data Capture |
|---|---|---|
| Code Value | Combobox | Y |
| Value | Checkbox | Y |
| Long Answer | Multi-Line question text box | Y |
| Multi Code Value | Listbox | Y |
| Time | Textbox Time | Y |
| New Window | Modal Launcher | N |
| Hyperlink | Hyperlink | N |
| Label | Static Question text | N |

As explained in greater detail below, each conversational question type has a set of parameters that the conversational question generation system 102 may set at run time. The parameters specify how the conversational question's control should display, whether the conversational question should perform data validation, and any other parameters that can be set to a control.

The conversational question generation system 102 may be in communication with multiple insurance claim processing center employee client computers 122-126 through a network 120. The insurance claim processing center employee client computers 122-126 may include a developer client computer 122, a question programmer client computer 124 and an insurance claim agent client computer 126. The client computers 122-126 may have different types of access levels for accessing the conversational question generation system 102. For example, the developer client computer 122 may have the highest tier access level, the question programmer client computer 124 may have a mid-tier access level, and the insurance claim agent 126 may have the lowest tier access level.

The different access levels may grant different types of access to the conversational question generation system 102. For example, the highest tier access level may grant access to modify the executable instruction sets 114, the conversational question master database schema 118, or any other components 104-118 of the conversational question generation system 102. In contrast, the mid-tier access level may restrict access to activities relating to conversational questions, such as generating conversational questions, modifying conversational questions, or removing conversational questions from the conversational question database 116. Finally, the lowest tier access level may restrict access to displaying conversational questions and providing answers to conversational questions.

Furthermore, the different access levels may be further subdivided into additional access levels. For example, the mid-tier access level may distinguish between basic users and advanced users. In general, the conversational question generation system 102 assigns a basic user to be a business analyst with limited exposure to technology and the advanced user who has solid understanding of the supporting technology of the insurance claim processing computer system. In one implementation, the conversational question generation system 102 permits an advanced user to set any property of the conversational question when creating and editing the conversational question. In contrast, the conversational question generation system 102 limits the basic user such that the basic user may only enter a subset of the properties on each control type. In addition, the lowest tier access level and the highest tier access level may distinguish between different types of users accessing the conversational question generation system 102.

Figure 2:
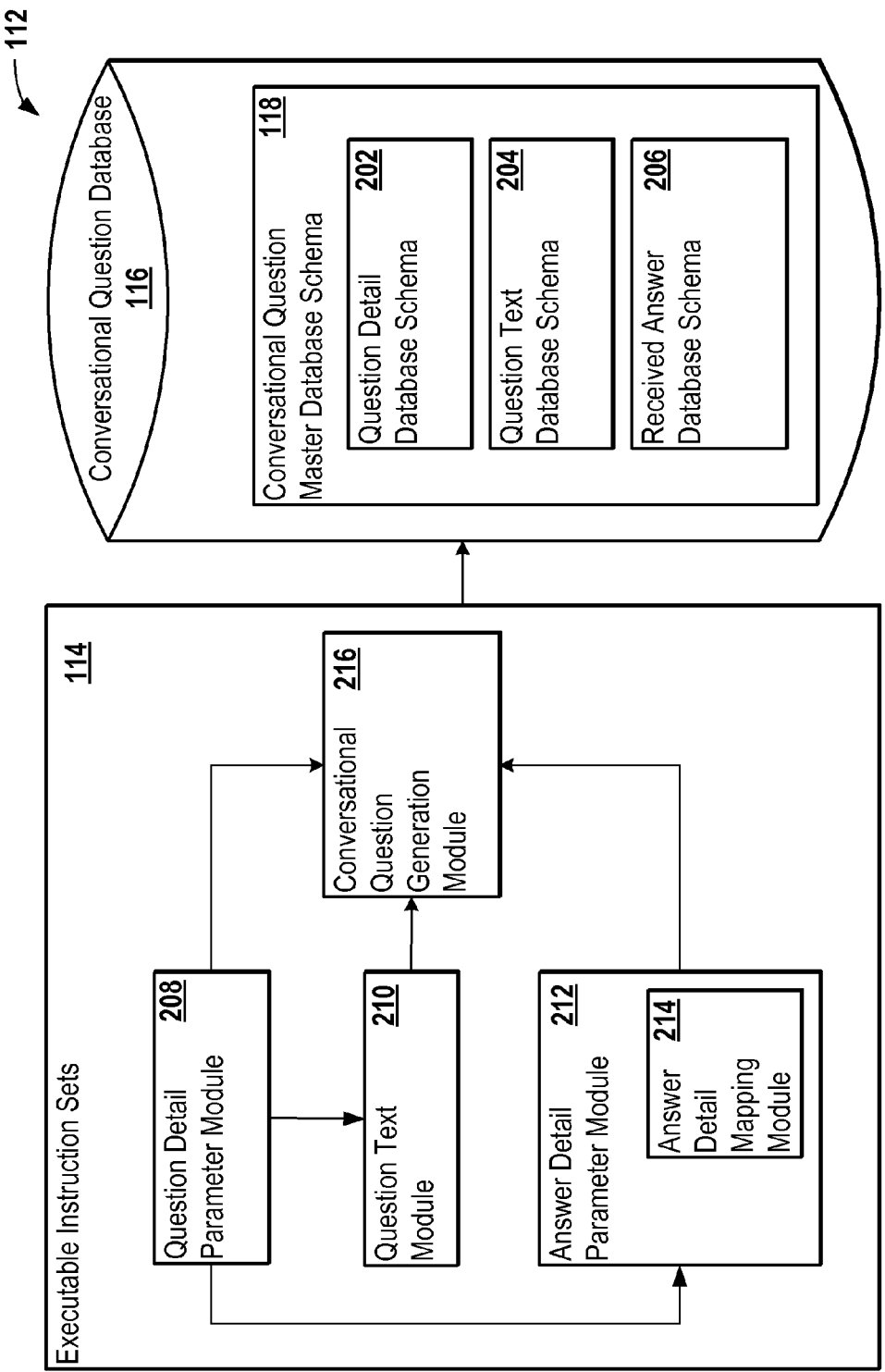
FIG. 2 shows various modules implemented by the executable instruction sets of FIG. 1 in communication with a conversational question database.

FIG. 2 shows various modules implemented by the executable instruction sets 114 of FIG. 1 in communication with the conversational question database 116, and shows additional details regarding the conversational question master database schema 118. In general, the conversational question master database schema 118 has entries that contain parameter values for the conversational question. However, the conversational question master database schema 118 may retain the parameter values for the conversational question across multiple database schemas. As shown in FIG. 2, the conversational question master database schema 118 is sub-divided into additional database schemas including a question detail database schema 202, a question text database schema 204, and a received answer database schema 206.

The question detail database schema 202 includes multiple question detail entries that define the parameters for the conversational question. Table 2 below shows one implementation of the question detail database schema 202. Table 2 includes a column for entries names, the type of data stored by the entry, whether the entry is initially set to a null value, whether the entry is used as a primary key, and whether the entry is used as a foreign key. Alternative arrangements of the question detail database schema 202 are also possible. For example, the question detail database schema 202 may include more or less entries than shown in Table 2.

tional question is assigned to an underwriting application of the insurance claim processing center.

The N_ORG_ENTITY_ID entry represents an organization entity identification parameter whose value is a foreign key to the organization entity identification number of the employee who created the conversational question.

The N_CONV_QUESTION TEXT_ID entry represents a question text identifier parameter whose value is a globally unique identifier (GUID) to the question text database schema 204 for the question text of the conversational question. The N_CONV_QUESTION TEXT_ID identifies the question text associated with the conversational question.

The M_QUES_XML_NM entry represents a conversational question name parameter whose value is a unique name that represents the name of the conversational question. In one implementation, the M_QUES_XML_NM entry stores a parameter value that is an XML Schema Element name. The parameter value stored by the M_QUEST_XML_NM entry may be used by more than one database or other data repository in the insurance claim processing computer system.

The C_STORAGE_TYP entry represents a storage type parameter whose value indicates the type of data to be

TABLE 2

| Name | Data Type | Null Option | Is Primary Key? | Is Foreign Key? |
|---|---|---|---|---|
| N_QUESTION_ID | char(16) | NOT NULL | Yes | No |
| N_APPLICATION_ID | char(16) | NOT NULL | No | Yes |
| N_ORG_ENTITY_ID | char(16) | NOT NULL | No | Yes |
| N_CONV_QUESTION TEXT_ID | char(16) | NOT NULL | No | Yes |
| M_QUES_XML_NM | Varchar(254) | NOT NULL | No | No |
| C_STORAGE_TYP | Char(1) | NOT NULL | No | No |
| C_DATA_TYP | Char(5) | NOT NULL | No | No |
| T_DATA_TYP_DETAIL | Varchar(254) | NOT NULL | No | No |
| C_PAGE_DISPLAY_TYP | Char(1) | NOT NULL | No | No |
| C_PART_IN_DISC_IND | Char(1) | NOT NULL | No | No |
| C_APPL_ACCESS | Char(1) | NOT NULL | No | No |
| C_PART_IN_NAV_IND | Char(1) | NOT NULL | No | No |
| D_EFFECTIVE | datetime | NOT NULL | No | No |
| D_EXPIRATION | datetime | NOT NULL | No | No |
| C_EXT_INTGR_USAGE | Char(5) | NOT NULL | No | No |
| M_EXT_INTGR_NM | Varchar(254) | NOT NULL | No | No |
| M_QUES_XML_NM_UC | Varchar(254) | NOT NULL | No | No |
| M_EXT_INTGR_NM_UC | Varchar(254) | NOT NULL | No | No |
| C_ANSWER_ONLY_IND | Char(1) | NOT NULL | No | No |
| C_RCD_DEL | Char(1) | NOT NULL | No | No |
| D_CREATE_TS | datetime | NOT NULL | No | No |
| D_LAST_UPDT_TS | datetime | NOT NULL | No | No |
| N_LAST_MOD | char(16) | NOT NULL | No | No |
| N_LAST_UPDT | int | NOT NULL | No | No |
| N_SYSTEM_MOD | Char(8) | NOT NULL | No | No |
| C_QUESTION_NBR | char(16) | NOT NULL | No | No |

Each of the entries of the question detail database schema 202 corresponds to a parameter of a question detail parameter for the conversational question. The N_QUESTION_ID entry represents a conversational question identifier parameter that is a unique identifier for the conversational question. The conversational question identifier parameter for the N_QUESTION_ID entry may be generated by the conversational question generation system 102 or by the insurance claim processing computer system.

The N_APPLICATION_ID entry represents a conversational question application identification parameter whose value is a unique identifier for the application to which the conversational question is assigned. For example, the N_APPLICATION_ID entry may indicate that the conversational question is assigned to a first notice of loss application of the insurance claim processing center. As another example, the N_APPLICATION_ID entry may indicate that the conversaanswered. Although the conversational question may support many different types of answers, the types of answers may include "modeled data," which is information retrieved from an identified table and column or a code/decode value from the database. The type of answer may also be "answer data," which is user defined information. In one implementation, "answer data" type answers are stored according to the received answer database schema 206. "Modeled data" type answers may be stored according to the received answer database schema 206, but "modeled data" type answers may be used to evaluate other expressions supported by the insurance claim processing computer system. The answer data may be retrieved from the database as requested, thereby ensuring data integrity and providing the most up-to-date information.

The C_DATA_TYP entry represents an answer data type parameter whose value indicates the answer data type to the insurance claim processing computer system. In one implementation, the parameter value stored by the C_DATA_TYPE entry identifies a conversational question type, such as one of the conversational question types previously discussed with reference to Table 1.

The T_DATA_TYP_DETAIL entry represents an answer detail entry that identifies an answer detail system parameter value formatted according to a predetermined system format. Each of the conversational questions types may have answer detail parameters, and each of the conversational question types may have answer detail parameters that are different from one another. In one implementation, the predetermined system format is a string format represented as a series of alphanumeric characters. Alternatively, or in addition, the predetermined system format may represent key value pairs corresponding to answer detail system parameter values.

The C_PAGE_DISPLAY_TYP entry represents a display type parameter whose value indicates the scope of the conversational question and its associated answer as they pertain to predetermined display and navigation rules of the insurance claim processing computer system. The C_PAGE_DISPLAY_TYP entry may store many different types of display type parameter values including "multi page," "child page," "single," and other display type parameter values. In one implementation, a display type parameter value of "multi page" indicates that the conversational question and answer are used on multiple graphical user interfaces displayed to a user of the insurance claim processing computer system. A "child page" parameter value indicates that the conversational question and answer are used on a previously defined graphical user interface including the children of the previously defined graphical user interface. A parameter value of "single" indicates that the conversational question and its answer are used on a single graphical user interface.

The C_PART_IN_DISC_IND entry represents a discrepancy parameter whose value indicates whether the conversational question is used as part of an error or discrepancy message of the insurance claim processing computer system. As one example, the value of the C_PART_IN_DISC_IND may be "true" where the conversational question is used as part of a discrepancy message or "false" where the conversational question is not used as part of a discrepancy message.

The C_APPL_ACCESS entry represents a code accessible parameter whose value indicates whether the conversational question is accessed by code within the business process of the application, and if the application may be checked before data storage type, or other conversational question detail parameters may be changed, or if the conversational question is to be removed.

The C_PART_IN_NAV_IND entry represents a navigation parameter whose value indicates whether the conversational question participates in a navigation rule that describes the flow of the graphical user interfaces of the insurance claim processing computer system. The navigation parameter may be used to signal to a user that the answer to a question will affect the presentation of graphical user interfaces.

The D_EFFECTIVE entry represents an activation parameter whose value indicates the effective calendar date of the conversational question. Similarly, the D_EXPIRATION entry represents an expiration parameter whose value indicates the expiration date of the conversational question. In one implementation, the D_EFFECTIVE entry indicates the calendar day on which the insurance claim processing computer system should begin displaying the conversational question, and the D_EXPIRATION entry indicates the calendar day on which the insurance claim processing computer system should stop displaying the conversational question.

The C_EXT_INTGR_USAGE entry represents an external integration usage parameter whose value indicates whether the conversational question and its corresponding answer will have an external integration usage. In general, external integration usage refers to the use of an outside vendor. One example of external integration usage is sending data to an outside vendor that schedules appointments for auto claim estimates. Such data may include the model of the car, its location and time the claimant is available to bring the car in for service. The external integration service may then send a response, representing an external integration input, to the insurance claim processing computer system. In one implementation, the parameter values for the C_EXT_INTGR_USAGE entry include "Input," "Output," and "NA." An "Input" parameter value indicates that the conversational question is used as input for integration; an "Output" parameter value indicates that the conversational question is returned as output from integration; and, an "NA" parameter value indicates that the conversational question is used as neither as input nor output.

The M_EXT_INTGR_NM entry represents an external integration name parameter whose value indicates the external integration name content used in evaluation or transformation. The M_EXT_INTGR_NM entry may be used when the C_EXT_INTGR_USAGE has a parameter value of "Input" or "Output."

The M_QUES_XML_NM_UC entry represents a conversational question search name parameter whose value indicates a search name for the conversational question. In one implementation, the search name is an uppercase character XML string. However, the M_QUES_XML_NM_UC entry may also store a parameter value of alphanumeric characters, an integer, or any other value.

The M_EXT_INTGR_NM_UC entry represents an integration search name parameter whose value indicates a search name of the conversational question integration name. In one implementation, the search name is an uppercase character XML string. However, the M_EXT_INTGR_NM_UC entry may also store a parameter value of alphanumeric characters, an integer, or any other value.

The C_ANSWER_ONLY_IND entry represents an answer-only parameter whose value indicates whether the conversational question is a question/answer conversational question or an answer-only conversational question. In one implementation, a question/answer conversational question is a question displayed to a user to which a user provides an answer. An answer-only conversational question is a conversational question that is not displayed to a user and does not have associated question text. An answer only question may be displayed to a user but its value may not be changed. The answer only question value is normally set by external integration input.

The question detail database schema 202 may also have computer system entries that represent parameters whose values are generated by the insurance claim processing computer system. For example, the C_RCD_DEL entry, the D_CREATE_TS entry, the D_LAST_UPDT_TS entry, the N_LAST_MOD entry, the N_LAST_UPDT entry, the N_SYSTEM_MOD entry, and the C_QUESTION_NBR entry are examples of entries that have parameter values that are automatically generated by the insurance claim processing computer system. In general, the parameter values for these entries are set in a database layer. The C_RCD_DEL entry indicates whether a question has been logically deleted. For example, where the question has not been deleted, the parameter value is "N"; where the user logically deletes the question, the parameter value is "Y." The C_QUESTION_

NBR entry is automatically generated when a question is created. The insurance claim processing computer system maintains a sequence of numbers of using with the C_QUESTION_NBR entry. In other implementations, the question detail database schema 202 may have more than or less than the number of computer system entries shown in Table 2.

The C_RCD_DEL entry represents a deleted parameter whose value identifies if the conversational question is marked as deleted. In one implementation, the conversational question is logically deleted from the conversational question database 116 and not physically deleted from the conversational question database 116. However, in other implementations, the conversational question may be physically deleted from the conversational question database 116.

the question text database schema 204 may store English question text, French question text, and German question text to represent a single conversational question. However, each conversational question may be represented by more or fewer languages.

Table 3 below shows one implementation of the question text database schema 204. Alternative arrangements of the question text database schema 204 are also possible. For example, the question text database schema 204 may include more or less entries than shown in Table 3. The question text database schema 204 may also have entries similar or identical to the entries found in the question detail database schema 202. For purposes of brevity, where the question text database schema 204 has entries similar to the question detail database schema 202, a discussion of those entries has been omitted.

TABLE 3

| Name | Data Type | Null Option | Is Primary Key? | Is Foreign Key? |
| --- | --- | --- | --- | --- |
| N_CONV_QUESTION TEXT_ID | char(16) | NOT NULL | Yes | No |
| N_SEQUENCE_NUM | int | NOT NULL | Yes | No |
| C_LANGUAGE | char(5) | NOT NULL | Yes | No |
| C_UPPERCASE_IND | char(1) | NOT NULL | Yes | No |
| N_APPLICATION_ID | char(16) | NOT NULL | No | Yes |
| T_MSG_QUESTION TEXT | varchar(4000) | NOT NULL | No | No |
| M_CONV_QUESTION TEXT_NM | varchar(50) | NOT NULL | No | No |
| M_CONV_QUESTION TEXT_NM_UC | varchar(50) | NOT NULL | No | No |
| C_DISC_MSG_IND | char(16) | NOT NULL | No | No |
| C_RCD_DEL | char(1) | NOT NULL | No | No |
| D_CREATE_TS | datetime | NOT NULL | No | No |
| D_LAST_UPDT_TS | datetime | NOT NULL | No | No |
| N_LAST_MOD | char(16) | NOT NULL | No | No |
| N_LAST_UPDT | int | NOT NULL | No | No |
| N_SYSTEM_MOD | char(8) | NOT NULL | No | No |
| D_LAST_UPDT_TS | datetime | NOT NULL | No | No |

The D_CREATE_TS entry represents an added calendar date parameter whose value indicates a calendar date for when the conversational question was added to the table. The D_LAST_UPDT_TS entry represents an updated calendar date parameter whose value indicates when the conversational question was last updated. The N_LAST_MOD entry represents a user parameter whose value indicates the user that last updated or created the conversational question in the conversational question database 116. The N_LAST_UPDT entry represents a parameter whose value changes every time a record is modified. In one implementation, the N_LAST_UPDT is updated by the insurance claim processing computer system and is used by optimistic locking. The N_SYSTEM_MOD entry represents a parameter whose value indicates a claim component system or any other system that uses the database schema to update the conversational question. The C_QUESTION_NBR entry represents a parameter whose value indicates an identifier that identifies the question. In one implementation, the C_QUESTION_NBR entry stores a parameter value that is an integer.

In addition to a question detail database schema 202, the conversational question master database schema 118 may also be divided into the question text database schema 204. In one implementation, the question text database schema 204 contains entries that represent all of the question text of the conversational questions stored in the conversational question database 116. The question text database schema 204 contains several entries that support the internationalization of conversational questions such that each conversational question stored in the conversational question database 116 may be represented in more than one language. For example, In one implementation, each of the entries of the question text database schema 204 corresponds to a parameter of the conversational question that describes the question text of the conversational question.

The N_CONV_QUESTION TEXT_ID entry represents a question text identifier parameter whose value is a unique identifier for the question text corresponding to the conversational question or other message. The unique identifier may be a number, a series of alphanumeric characters, or any other type of identifier. The parameter value for the N_CONV_QUESTION TEXT_ID entry may be generated by the insurance claim processing computer system, by the conversational question generation system 102, or any other system.

The N_SEQUENCE_NUM entry represents a sequence number parameter whose value is a sequence number when the question text of the conversational question is greater than a predetermined question text character limit. In one implementation, the question text character limit is 4000 characters. In this implementation, when the number of characters in the question text of the conversational question is less than 4000 characters, the N_SEQUENCE_NUM parameter value is 0. However, when the number of characters in the question text of the conversational question is less than 4000 characters, the N_SEQUENCE_NUM parameter value starts at the number 1, and as additional rows of question text are added, the N_SEQUENCE_NUM parameter value is incremented by 1 and the incremented parameter value is associated with the added question text.

The C_LANGUAGE entry represents a language parameter whose value indicates the language culture of the question text. The C_LANGUAGE entry helps the use of multiple languages for the conversational question. The conversational question may have multiple C_LANGUAGE entries. In one implementation, the C_LANGUAGE entry indicates a number and the number is associated with a language. For example, the number "0409" may be associated with "English" and the number "040C" may be associated with French. In this example, the conversational question that is associated with multiple C_LANGUAGE entries is displayable in multiple languages. The language of the question text may be selected based on input provided by a user or the language of the question text may be selected by the conversational question generation system 102 or the insurance claim processing computer system.

The C_UPPERCASE_IND entry represents an uppercase parameter whose value is an uppercase indicator row for searches or the mixed case row for display, which is used for question text searches by the conversational question generation system 102 or the insurance claim processing computer system. The C_UPPERCASE_IND indicates a row containing a question in upper case.

The N_APPLICATION_ID entry represents a question text application parameter whose value is a unique identifier for the application to which the question text is assigned. For example, the N_APPLICATION_ID entry may indicate that the question text is assigned to a first notice of loss application of the insurance claim processing center. As another example, the N_APPLICATION_ID entry may indicate that the question text is assigned to underwriting.

The T_MSG_QUESTION TEXT entry represents a question text message parameter whose value is the question text of the conversational question or other message for display. The conversational question may have one or more associated T_MSG_QUESTION TEXT entries based on the number of languages associated with the conversational question. For example, a conversational question written in English, French, and German has three separate T_MSG_QUESTION TEXT entries: a T_MSG_QUESTION TEXT entry that stores English text; a T_MSG_QUESTION TEXT entry that stores French text; and, a T_MSG_QUESTION TEXT entry that stores German text.

The M_CONV_QUESTION TEXT_NM represents a question text name parameter whose value is an identifying name of the question text associated with the conversational question. The question text name parameter value may be used by the conversational question generation system 102, by the insurance claim processing computer system, or any other system, for searching and selecting the question text associated with the conversational question.

The M_CONV_QUESTION TEXT_NM_UC entry represents an uppercase question text name parameter whose value is an uppercase parameter value of the parameter value stored in the M_CONV_QUESTION TEXT_NM entry. The insurance claim processing computer system may use the uppercase question text name parameter to facilitate name searches in the conversational question database 116.

The C_DISC_MSG_IND entry represents a discrepancy message indicator parameter that indicates whether the question text is used for a discrepancy rule or for the conversational question.

Furthermore, the conversational question master database schema 118 may also be sub-divided into the received answer database schema 206. In one implementation, the question text database schema 204 contains entries for answers supplied to the conversational questions. In one implementation, the received answer database schema 206 is configured to receive answers to the conversational questions that are not "modeled data" answers.

Table 4 below shows one implementation of the received answer database schema 206. Alternative arrangements of the received answer database schema 206 are also possible. For example, the received answer database schema 206 may include more or less entries than shown in Table 4. The received answer database schema 206 may also have entries similar or identical to the entries found in the question detail database schema 202 or the question text database schema 204. For purposes of brevity, where the received answer database schema 206 has entries similar to the schemas 202 and 204, a discussion of those entries has been omitted.

TABLE 4

| Name | Data Type | Null Option | Is Primary Key? | Is Foreign Key? |
| --- | --- | --- | --- | --- |
| N_ANSWER_ID | char(16) | NOT NULL | Yes | No |
| N_SEQUENCE_NUM | int | NOT NULL | Yes | No |
| N_CONVERSATION_ID | char(16) | NOT NULL | No | Yes |
| N_CONV_RULE_ASN_ID | char(16) | NOT NULL | No | Yes |
| N_NODE_ID | char(16) | NOT NULL | No | No |
| T_STRING_ANSWER | varchar(4000) | NOT NULL | No | No |
| D_DATE_ANSWER | datetime | NOT NULL | No | No |
| N_INTEGER_ANSWER | int | NULL | No | No |
| N_DOUBLE_ANSWER | decimal(19.6) | NULL | No | No |
| A_CURRENCY_ANSWER | decimal(19.6) | NULL | No | No |
| C_CODE_ANSWER | char(5) | NOT NULL | No | No |
| C_BOOLEAN | char(1) | NOT NULL | No | No |
| C_RCD_DEL | char(1) | NOT NULL | No | No |
| D_CREATE_TS | datetime | NOT NULL | No | No |
| D_LAST_UPDT_TS | datetime | NOT NULL | No | No |
| N_LAST_MOD | char(16) | NOT NULL | No | No |
| N_LAST_UPDT | int | NOT NULL | No | No |
| N_SYSTEM_MOD | char(8) | NOT NULL | No | No |

In one implementation, each of the entries of the received answer database schema 206 corresponds to a parameter of a received answer to the conversational question that describes the received answer of the conversational question. The parameter values for the received answer may be provided by any number of actors or systems. For example, the parameter values for the received answer may be provided by an insurance claim agent, provided by an insurance customer using a graphical user interface, or another system in communication with the conversational question generation system 102.

The N_ANSWER_ID entry represents a received answer identifier parameter whose value is a unique identifier for a received answer. The received answer identifier parameter value may be generated by the conversational question generation system 102, by the insurance claim processing computer system, or any other system.

The N_SEQUENCE_NUM entry represents a received answer sequence identifier parameter whose value is a sequence identification denoting the sequence of the rows associated with the received answer. For example, a received answer may have a number of alphanumeric characters that is greater than a predetermined limit of alphanumeric characters. When the alphanumeric characters of a received answer exceed the predetermined limit, the additional alphanumeric characters may be stored in additional rows associated with the received answer. Hence, the N_SEQUENCE_NUM entry determines the order of the rows.

The N_CONVERSATION_ID entry represents a conversational question identifier parameter whose value is foreign key to conversation table of the insurance claim processing computer system. Similarly, the N_CONV_RULE_ASN_ID entry represents a conversational rule identifier parameter whose value is a foreign key to a conversational rule table.

The N_NODE_ID entry represents a received answer node identifier parameter whose value is a generated unique node identifier. The answer node identifier parameter associates a received answer to a node in the insurance claim processing computer system that receives the answer. In one implementation, the N_NODE_ID entry indicates the web page of the question that was presented to the user. The N_NODE_ID entry helps the insurance claim processing computer system determine on which web page the answer for the question was collected.

The received answer database schema 206 also has entries for the different types of answers receivable by the insurance claim processing computer system or the conversational question generation system 102.

The T_STRING_ANSWER entry represents a text string parameter whose value is a text answer provided for the associated conversational question where the type of data is defined as a string. An example of a text string parameter value is "Toyota Corolla."

The D_DATE_ANSWER entry represents a date parameter whose value is a date format where the type of data for the conversational question was defined as a date. An example of a date parameter value is "01/01/2008".

The N_INTEGER_ANSWER entry represents an integer parameter whose value is a positive or negative "whole" number where the type of data of the conversational question was defined as an integer. An example of an integer parameter value is "1234."

The N_DOUBLE_ANSWER entry represents a double parameter whose value is a number in which the decimal point can be in any position and where the type of data of the conversational question was defined as a double. An example of a double parameter value is "1.234."

The A_CURRENCY_ANSWER entry represents a decimal parameter whose value is a number expressed in base-10 notation, regardless of whether there are any digits to the right of the decimal point. However, the decimal parameter value may also be expressed in other notation formats, such as base-2 or base-16 notation. An example of a currency parameter value is "$3.44."

The C_CODE_ANSWER entry represents a code/decode parameter whose value is a code/decode value answer where the data type of the conversational question was defined as a code. In general, a code/decode value is an alphanumeric representation of another valid value. For example a code/decode value of "8A" may represent "United States of America." Code/decode values assist in internationalizing valid values and efficiently store data in the database by taking up less space.

The C_BOOLEAN entry represents a Boolean parameter whose value is a true or false value where the data type of the conversational question was defined as a Boolean. An example of a Boolean parameter value is "true."

The executable instruction sets 114 of FIG. 2 implement various modules that are used to populate the conversational question database 116 according to the question detail database schema 202, the question text database schema 204, and the received answer database schema 206. In one implementation, the executable instructions sets 114 implement a question detail parameter module 208, a question text module 210, an answer detail parameter module 212, and a conversational question generation module 216. However, the executable instruction sets 114 may implement more or fewer modules.

The question detail parameter module 208 is configured to receive a question detail parameter value that corresponds to a question detail parameter. The question detail parameter module 208 may use a graphical user interface or other communication interface to receive the question detail parameter value. For example, the question detail parameter module 208 may receive the question detail parameter value from one of the client computers 122-126 through network 120. As another example, the question detail parameter module 208 may receive the question detail parameter value from one of the components 104-110 of the conversational question generation system 102, such as from the I/O devices 110. In addition, the question detail parameter value may be provided by any number of actors or systems. For example, the question detail parameter value may be provided by an insurance claim agent, provided by an insurance customer using a graphical user interface, or provided by another system in communication with the conversational question generation system 102.

The question detail parameter module 208 is also in communication with the conversational question generation module 216. The question detail parameter module 208 may transmit one or more question detail parameter values to the conversational generation module 216 for dynamically generating the conversational question.

In addition, the question detail parameter module 208 is configured to display parameter values for a previously generated conversational question or edit the parameter values for a previously generated conversational question. The question detail parameter module 208 may communicate with the conversational question database 116 to retrieve parameter values, such as question detail parameter values, associated with the conversational question.

In one implementation, the question detail parameter module 208 implements multiple graphical user interfaces for viewing, editing, and storing parameter values associated with the conversational question. For example, the question detail parameter module 208 may use a graphical user interface for viewing the question detail parameter values associated with the conversational question. FIG. 3 shows one example of a viewing mode graphical user interface 300 implemented by the question detail parameter module 208.

As shown in FIG. 3, the viewing mode graphical user interface 300 displays conversational question controls 302-308 for creating, editing, and viewing parameter values of conversational questions. Using the conversational question controls 302-308, a user has the ability to delete the conversational question, generate a new conversational question, generate a new conversational question using existing conversational question parameter values, expire the conversational question, etc. Any number of controls may be included in the viewing mode graphical user interface 300 for modifying or manipulating conversational questions.

Although the viewing mode graphical user interface 300 may display many different types of controls, in one example, the viewing mode graphical user interface 300 may be configured to display an add conversational question control 302, a create-like conversational question control 304, an expire conversational question control 306, and an add-to-container conversational question control 308. The add conversational question control 302 is configured to instruct the question detail parameter module 208 to start the process of creating a new conversational question. The create-like conversational question control 304 is configured to instruct the question detail parameter module 208 to start the process of creating a new conversational question having parameter values similar to an existing conversational question In generating a conversational question from a pre-existing conversational question, the create-like conversational question control 304 is configured to instruct the question detail parameter module 208 to use pre-existing parameter values from the pre-existing conversational question. The question detail module 208 may communicate with other modules, such as the question text module 210, to populate the parameter values of the new conversational question. Moreover, when the create-like conversational question control 304 is activated, the question detail module 208 may populate more than one type of parameter values, such as question detail parameter values, question text parameter values, and answer detail parameter values. Examples of parameters that are used in creating a new conversational question using the create-like conversational question control 304 include the question text message parameter, the external integration usage parameter, the display type parameter, the question text parameters, and the answer detail parameters.

In expiring the conversational question, the expire conversational question control 306 is configured to instruct the question detail parameter module 208 that the conversational question is not to be displayed in the insurance claim processing computer system. Although the conversational question parameter values may be deleted from the conversational question database 116, the conversational question generation system 102 may be configured to retain the parameter values of the conversational question in the conversational database 116 when the conversational question is expired. For example, retaining the parameter values of an expired conversational question may provide historical submission information for accounting and tracking purposes. In addition, the conversational generation system 102, the insurance claim processing computer system, or any other system, may search for and display expired conversational questions. In one implementation, when the conversational question is expired (e.g., deleted), the conversational question is no longer available to the insurance claim processing computer system and the conversational question may be deleted when an effective date parameter value is not associated with the conversational question.

In addition, the conversational question generation system 102 may have validation rules regarding expiring the conversational question. For example, the question detail parameter module 208 may be configured to establish the expiration parameter value as a calendar date when the conversational question expiration control 306 was activated. The question detail parameter module 208 may also implement a validation rule that prevents the expiration of conversational questions that are not assigned an activation parameter value.

In addition to the conversational question controls 302-308, the viewing mode graphical user interface 300 displays question detail parameter values associated with the conversational question according to the question detail database schema 202. Table 5 below shows the association between the entries of the question detail database schema 202 and the question detail parameters shown in FIG. 3. Table 5 also shows exemplary values for the question detail parameter values as shown in FIG. 3.

TABLE 5

| Name | Question Detail Database Schema Entry | Value |
| --- | --- | --- |
| Application | N_APPLICATION_ID | FNOL |
| Question Name | M_QUES_XML_NM | WereThereAnyWitnesses |
| Storage Type | C_STORAGE_TYP | Answer |
| Data Type | C_DATA_TYP | Code |
| Page Display | C_PAGE_DISPLAY_TYP | Single |
| Application Change required | C_APPL_ACCESS | No |
| Activation Date | D_EFFECTIVE | Jan. 01, 1800 |
| Expiration Date | D_EXPIRATION | Dec. 31, 2999 |
| Integration | C_EXT_INTGR_USAGE | N |
| Integration Service | M_EXT_INTGR_NM | Char(9) |
| Question Name | M_QUES_XML_NM_UC | WHERETHEREANY WITNESSES |
| Integration Service | M_EXT_INTGR_NM_UC | Char(9) |
| Answer Only | C_ANSWER_ONLY_IND | No |

As previously discussed, the question detail parameter module 208 supports creating and editing question detail parameters for the conversational question. FIG. 4 is an example of an edit mode graphical user interface 400 that facilitates communication with the question detail parameter module 208 to create or edit question detail parameters.

In one implementation, the question detail parameter module 208 tracks the modifications to the conversational question. For example, when the conversational question is edited, the question detail parameter module 208 may generate a new copy of the edited conversational question. Thereafter, when the conversational question is modified the copy of that conversational question is versioned. After each modification to the conversational question, the old copy of the conversational question without the edits is expired, and the new copy of the conversational question with the modifications is activated, for example, starting the next day. However, the question detail parameter module 208 may not monitor each modification to the conversational question. For example, the conversational detail parameter module 208 may monitor types of modifications to the conversational question or may be configured to monitor modifications to preselected parameters of the conversational question. Other types of monitoring modifications to the conversational question are also possible.

By tracking the modifications to the conversational question, systems currently using the conversational question continue to use the unedited conversational question, but any subsequent uses of the conversational question are of the edited conversational question. Although the edited conversational question may be configured for immediate activation, the question detail parameter module 208 may use a delay in the edited conversational question. For example, in one implementation, when a user desires to have an edited conversational question activated at some future date, the user may use the create-like conversational control 304 and set the activation date of the clone of the conversational question to the desired date, and then set the old conversational question to expire before the cloned conversational question goes into effect.

The question detail parameter module 208 also supports the user access levels discussed above. For example, the question detail parameter module 208 may permit an advanced user to edit or provide parameter values for all properties that define the conversational question. More particularly, an advanced user may have access privileges to edit or provide a parameter value for the answer-only parameter, the external integration usage parameter, the external integration name parameter, and the code accessible parameter. As another example, a basic user may have access privileges to a smaller subset of parameters. More particularly, the question detail parameter module 208 may limit a basic user to prevent a basic user from editing a providing a parameter value for the answer-only parameter, the external integration usage parameter, the external integration name parameter, and the code accessible parameter. However, other types of configurations of access levels are also possible. For example, a basic user may have more or less access to edit or provide parameters values for more or less parameters. The question detail parameter module 208 may also not distinguish between an advanced user and a basic user. Hence, a basic user may be an advanced user.

In general, a user may use the edit mode graphical user interface 400 to provide parameter values for the question detail parameters of the conversational question. In one implementation, the edit mode graphical user interface 400 includes various user interface elements, such as text boxes, drop-down boxes, radio buttons, check boxes, or other user interface elements for accepting user input. Providing question detail parameter values may include providing the conversational question name, assigning the conversational question to an application, defining the data type of the conversational question, and indicating the page display of the conversational question. Providing question detail parameter values may also include providing an activation and expiration date, and indicating whether the question serves as input or output to an integration touch point. In general, an integration touch point is a call to a rules engine that is configured to determine claim complexity or rules service that indicates potential fraud. Where the conversational question is part of an integration service, the name of the integration service may be provided. Lastly, an application change may be required where the conversational question changes the application code.

A user may provide any type of name for the conversational question. In one implementation, the conversational question name conforms TO XML 1.0 standards for naming XML nodes, as defined by the W3C in the Extensible Markup Language 1.0, Third Edition. The conversational question generation system 102 may be configured to permit the user to change the name of the conversational question. However, in one implementation, the conversational question generation system 102 does not permit the user to change the conversational question name. For example, the conversational question generation system 102 may not allow duplicate conversational question names.

The conversational question generation system 102 may be in communication with an external integration rules engine (not shown). An example of an integration rules engine is an industry service that indicates if there is potential fraud. In one implementation, an integration rules engine evaluates answers to conversational questions. For example, the answer to the conversational question may be used as input for the integration rules engine. Examples of answers used in an integration rules engine include a string value that holds an XML document or a code/decode value that represents the output from the rules engine. In another implementation, the integration rules engine provides evaluation and an answer to the conversational question. The conversational question generation system 102 may use one or more parameters, such as the integration search name parameter and the external integration usage parameter to communicate with the external integration rules engine. The conversational question generation system 102 may use fewer or more parameters to communicate with the external integration rules engine.

In one implementation, the question detail parameter module 208 is configured with default conditions for the expiration and activation parameter values accepted by the question detail parameter module 208. For example, the question detail parameter module 208 may be configured with a condition that establishes that a valid expiration parameter value is a parameter value that is greater than a previously accepted activation parameter value. As another example, the question detail parameter module 208 may be configured with a condition that establishes that a valid activation parameter value is a parameter value greater than a following or present calendar date. As yet a further example, the question detail parameter module 208 may be configured with a condition that establishes that when the conversational question becomes active, the activation parameter value for the activated conversational question may not be modified or deleted.

In another implementation, the question detail parameter module 208 is configured with default parameter values for the expiration parameter value and the activation parameter value of conversational questions. As examples, the default value for the expiration parameter value may be Dec. 31, 2999 and the default value for the activation parameter may be the calendar date following the present calendar date.

The question detail parameter module 208 may also be configured with additional predetermined conditions regarding other parameters and their associated parameter values. For example, the question detail parameter module 208 may be configured with a condition that establishes that when the storage type parameter value for the conversational question is "modeled data," then the code accessible parameter value indicates that the conversational question is accessed by code within a business process of an application. As another example, the question detail parameter module 208 may be configured with a condition that establishes that when the conversational question is used as part of multiple messages in the insurance claim processing computer system, the question may not be deleted or expired until the conversational question is disassociated from all of the messages.

Although various implementations above illustrate examples of possible conditions for the question detail parameter module 208, the question detail parameter module 208 may not be configured with any conditions. In alternative implementations, the question detail parameter module 208 is configured with additional conditions or with fewer conditions. Similarly, the question detail parameter module 208 may be configured with default parameter values for other question detail parameters.

Some of the parameter values received by the question detail parameter module 208 may affect the question text module 210. For example, the question detail parameter module 208 may be configured with a condition relating to the answer-only parameter. In general, the question detail parameter module 208 is configured to receive a question text parameter value that corresponds to the question text entry of the question text database schema 202. However, the answer-only parameter may determine whether the question text module 210 should expect to receive a question text parameter value. For example, when the answer-only parameter indicates that the conversational question is an answer-only conversational question, the question text module 210 may not receive a question text parameter value. Alternatively, where the answer-only parameter indicates that the conversational question is not an answer only conversational question, the question text module 210 may receive a question text parameter value.

In addition, some of the parameter values received by the question detail parameter module 208 may affect the answer detail parameter module 212. For example, the answer data type parameter (Table 5) may affect the answer detail parameter module 212. More particularly, in one implementation, the answer data type parameter may determine the answer detail parameters receivable by the answer detail parameter module 212. As discuss below with reference to FIGS. 6-15, the answer detail parameter module 212 may be configured to display and communicate with different types of answer detail graphical user interfaces. The answer data type parameter value communicated to the answer detail parameter module 212 may determine the display of the answer detail graphical user interface. In other words, the set of answer detail parameters that are displayed may be driven by the answer data type parameter value. However, in other implementations the answer data type parameter value does not affect or may partially affect the answer detail parameter module 212 or the answer detail graphical user interfaces displayed by the answer detail parameter module 212. For example, in an alternative implementation, the answer detail parameter module 212 displays an answer detail graphical user interface that accepts parameter values for all possible answer detail parameters. The conversational question generation system 102 may also use additional or fewer answer detail graphical user interfaces.

Figure 5:
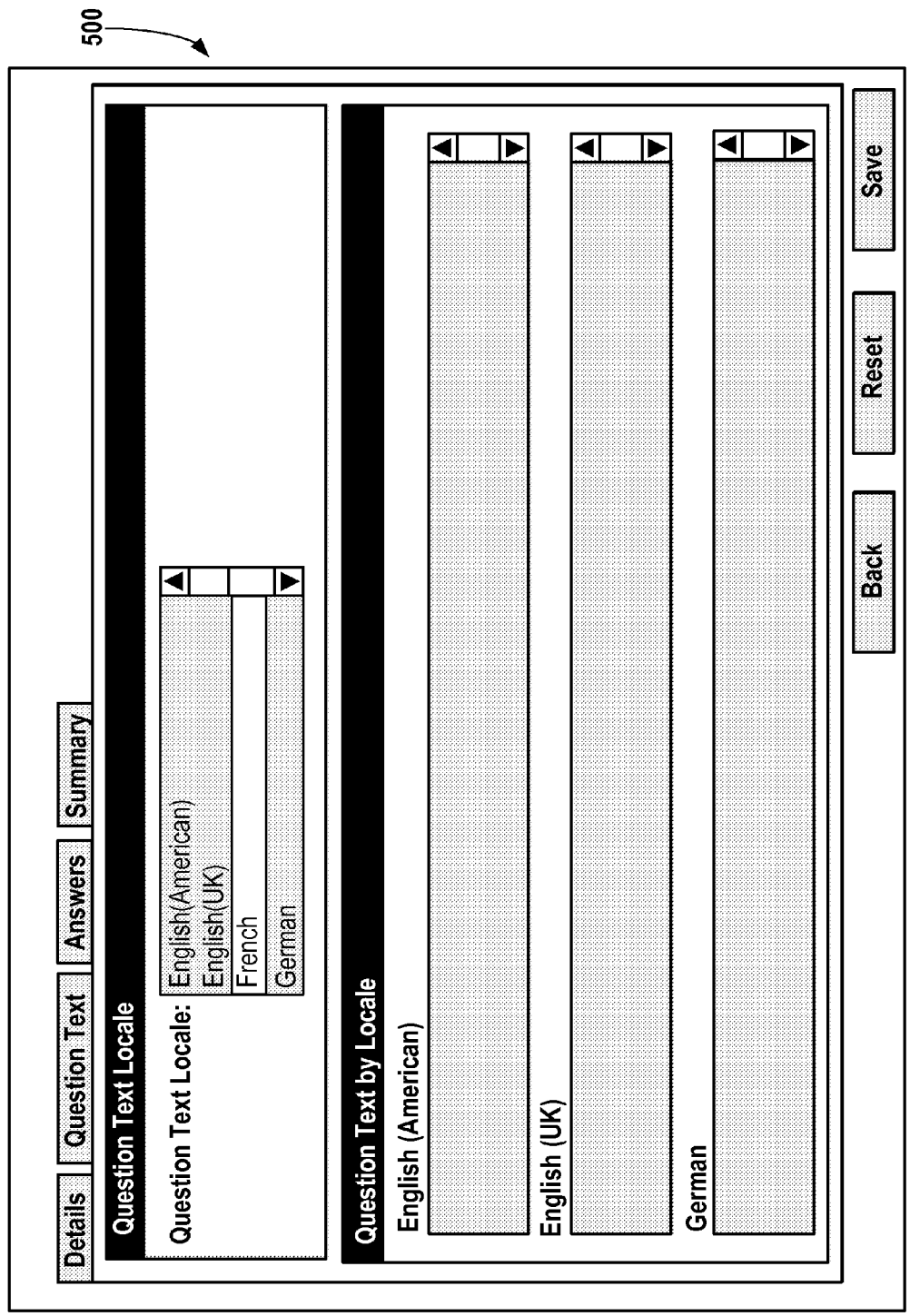
FIG. 5 shows one example of a question text graphical user interface implemented by the question text module of FIG. 2.

FIG. 5 is an example of a question text graphical user interface 500. As previously discussed, the question text module 210 is configured to receive question text parameter values that correspond to the question text entry of the question text database schema 204. In one implementation, the question text module 210 displays and communicates with the question text graphical user interface 500 to receive question text parameter values that each correspond to a language parameter value. Table 6 below shows one exemplary association between some entries of the question text database schema 204 and the question text parameters shown in FIG. 5. Table 6 also shows exemplary values for the question text parameter values.

TABLE 6

| Name | Question Text Database Schema Entry | Value |
| --- | --- | --- |
| Question Text Language | C_LANGUAGE | English(American) |

TABLE 6-continued

| Name | Question Text Database Schema Entry | Value |
| --- | --- | --- |
| Question Text | T_MSG_QUESTION TEXT | Where there any witnesses? |

In one implementation, the conversational question is associated with different language parameter values and different question text message parameters. For example, a conversational question may have three language parameter values that indicate that the conversational question is displayable in the English language, the German language and the French language. Similarly, and in this example, the conversational question may be associated with three question text message parameter values, where each question text message parameter value indicates the English language version of the conversational question, the German language version of the conversational question, and the French language version of the conversational question.

Hence, the conversational generation system 102 is configured to dynamically generate international conversational questions using the question text module 210. In one implementation, dynamically generating an international conversational question may include inserting rows for each language of the conversational question into the conversational question database 116. For example, there may be a zero-to-many relationship between the question detail database schema 202 and the question text database schema 204.

As previously discussed, in addition to question detail parameters and question text parameters, the conversational question also may be associated with answer detail parameters. In general, answer detail parameters describe the answer data type parameter assigned to the conversational question. More particularly, the answer detail parameter values determine how the conversational question displays and the behaviors the conversational question exhibits when the insurance claim processing computer system uses the conversational question. There are many different types of answer detail parameters, and the conversational question may be associated with all or some of these answer detail parameters.

Furthermore, the answer detail parameters may be represented in different formats by the conversational question generation system 102 and the insurance claim processing computer system. In one implementation, the conversational question generation system 102 uses an answer detail conversational parameter format and the insurance claim processing computer system uses an answer detail system parameter format. In this implementation, the answer detail parameter module 212 includes an answer detail mapping module 214 that maps the answer detail conversational parameter format to the answer detail system parameter format. The answer detail mapping module 214 is further explained below.

Table 7 shows one implementation of the answer detail parameters used in the conversational question generation system 102. Alternative implementations of the answer detail parameters may include more or less answer detail parameters. Alternative implementations of the answer detail parameters may also include different types of answer detail parameters.

TABLE 7

| Displayed Answer Detail Parameter | Control Type | Brief Description |
| --- | --- | --- |
| Data Type | Data Code | Read-only version of the selected answer data type parameter value from the question detail parameter module. The answer data type parameter value drives the display of the answer detail parameters. |
| Control Type | Data Code | The corresponding control rendered on the conversational question for the answer. |

TABLE 7-continued

| Displayed Answer Detail Parameter | Control Type | Brief Description |
|---|---|---|
| Web Address | Textbox | The URL for a Link control. |
| Target Page Context | Textbox | The additional context that is passed to the target page. |
| Target Page ID | Combobox | The page that the modal launcher control navigates to. A modal launcher launches a new web page in a modal window. The user sees the page name while system uses the assembly ID. |
| Button Label | Combobox | A selectable list of Button Text. The resolved literal is displayed to the user while the RMU key is used as the key to control. An RMU key retrieves a literal from a resource file. The RMU is used to store all of the applications literals and helps internationalization of the application. |
| Button Type | Combobox | A selectable list of Button Styles. The resolved literal is displayed to the user while the RMU key is used as the key to the control. |
| Prompt User to Save | Datavalue | Indicates that the conversational question is involved in dirty flag processing. If the answer to the conversational question was changed and the user attempts to leave the page without saving, a warning message is displayed. |
| Display Category | Datavalue | The literal representation of the code category that makes up the items in the control. |
| Display Length | Combobox Code | The display length of the display category. |
| Display Order | Combobox Code | The display order of the display category. |
| Column Width | Textbox Integer | The column width of the control when displayed. |
| Default Value | Combobox | A list of literals that may be used as default items in a Combobox. The user views the resolved literals while the system saves the RMU key. |
| Enable Default | Combobox | Indicates if the control will display a default value. |
| Dependent Display Section | Textbox | Names the HTML DIV ID that may be enabled in relation to the selected value in a combo or list box. |
| Align Left | Combobox | True or False value to allow or disallow the Left Align of the ModalDialog or Link Button label. |
| Maximum Length | Textbox integer | The maximum length of a string. |
| Minimum Length | Textbox integer | The minimum length of a string. |
| Minimum Value | Textbox double | The minimum value of a numeric control. |
| Refresh | Combobox | Indicates that changing the value in the control will cause the system to post back. |
| Read Only | Combobox | Indicates if the control is read-only. |
| Filtering Category | Datavalue | The related code category. |
| Filtering Code | Datavalue | The selected code from the related code category. |
| Required for Save | Combobox | Indicates if the question must be answered before the page may be saved. |
| Return Page | Textbox | Name of the return event when focus returns from the modal window. |
| Returned Value | Combobox | True or False value defining whether the modal window returns a value that must be handled. |
| Required for Page Complete | Combobox | If the parameter is set to a true value, the page on which the conversational question appears may be saved but may not be marked as visited until the conversational question is answered. |
| Output Value | Textbox | The data that may be sent to a modal window. |
| Decimal Places | Textbox integer | The number of decimal places used in numeric control that uses precision. |
| Currency UOM | Combobox | The unit of measure (UOM) that a currency conversational question uses. |

The answer detail parameter module 212 is configured to receive a parameter value for some or all of the answer detail parameters described above in Table 7. In response to receiving a parameter value for the answer detail parameters, the answer detail parameter module 212 may display one or more answer detail graphical user interfaces. With reference to FIG. 2, FIGS. 6-15 are examples of different types of answer detail graphical user interfaces that may be displayed by the answer detail module 212. As previously described with reference to FIG. 2, the type of answer detail graphical user interface displayed may be determined from the answer data type parameter value received by the question detail parameter module 208.

As previously discussed, answer detail parameters may be associated with an answer data type. The association between the answer data type and the answer detail parameters may determine which answer detail parameters are configurable for an answer data type. Tables 8 and 9 show one example of associations between answer detail parameters and their answer data type. In addition, an answer detail parameter may be displayed based on which answer data type the answer detail parameter is associated. Table 8 shows which answer detail parameters are associated with the answer data types of short answer, date, number, numeric, currency, code value, or value.

TABLE 8

| Answer Detail Parameter/ Data Type | Short Answer | Date | Number | Numeric | Currency | Code Value | Value |
|---|---|---|---|---|---|---|---|
| Web Address | | | | | | | |
| Target Page Context | | | | | | | |
| Target Page ID | | | | | | | |

TABLE 8-continued

| Answer Detail Parameter/ Data Type | Short Answer | Date | Number | Numeric | Currency | Code Value | Value |
|---|---|---|---|---|---|---|---|
| Button Label | | | | | | | |
| Button Type | | | | | | | |
| Prompt User to Save | X | X | X | X | X | X | X |
| Display Category | | | | | | X | |
| Display Length | | | | | | X | |
| Display Order | | | | | | X | |
| Column Width | X | X | X | X | X | X | X |
| Default Value (text) | | | | | | X | X |
| Default Value (numeric) | | | X | X | X | | |
| Enable Default | | | | | | X | |
| Dependent Display Section | | | | | | X | X |
| Align Left | | | | | | | |
| Maximum Length | X | | | | | | |
| Minimum Length | | | X | X | X | | |
| Minimum Value | | | X | X | X | | |
| Refresh | X | X | X | X | X | X | X |
| Read Only | X | X | X | X | X | X | X |
| Filtering Category | | | | | | X | |
| Filtering Code | | | | | | X | |
| Required for Save | X | X | X | X | X | X | X |
| Return Page | | | | | | | |
| Returned Value | | | | | | | |
| Required for Page Complete | X | X | X | X | X | X | X |
| Output Value | | | | | | | |
| Decimal Places | | | | X | X | | |
| Currency UOM | | | | | X | | |

Table 9 shows which answer detail parameters are associated with the answer data types of long answer, multi code value, time, new window, hyperlink, or label.

In addition, the answer detail parameter module 212 may be configured to receive or edit answer detail parameter values based on the previously discussed detected access level.

TABLE 9

| Answer Detail Parameter/ Data Type | Long Answer | Multi Code Value | Time | New Window | Hyperlink | Label |
|---|---|---|---|---|---|---|
| Web Address | | | | | X | |
| Target Page Context | | | | X | | |
| Target Page ID | | | | X | | |
| Button Label | | | | X | | |
| Button Type | | | | X | | |
| Prompt User to Save | X | X | X | | | |
| Display Category | | X | | | | |
| Display Length | | X | | | | |
| Display Order | | X | | | | |
| Column Width | X | X | X | | | |
| Default Value (text) | | | | | | |
| Default Value (numeric) | | | | | | |
| Enable Default | | X | | | | |
| Dependent Display Section | | | | | | |
| Align Left | | | | X | X | |
| Maximum Length | X | | | | | |
| Minimum Length | | | | | | |
| Minimum Value | | | | | | |
| Refresh | X | X | X | | | |
| Read Only | X | X | X | | | |
| Filtering Category | | X | | | | |
| Filtering Code | | X | | | | |
| Required for Save | X | X | X | | | |
| Return Page | | | | X | | |
| Returned Value | | | | X | | |
| Required for Page Complete | X | X | X | | | |
| Output Value | | | | X | | |
| Decimal Places | | | | | | |
| Currency UOM | | | | | | |

Accordingly, in one implementation, the answer detail parameters that are received are dependent both on the answer data type parameter value received and the detected access level. Table 10 shows the answer detail parameters associated with a corresponding access level. In alternative implementations of the answer detail parameter module 212, the answer detail parameters may not be associated with an access level. Other implementations are also possible.

TABLE 10

| Answer Detail Parameter/Access Level | Basic | Advanced |
| --- | --- | --- |
| Web Address | | X |
| Target Page Context | | X |
| Target Page ID | | X |
| Button Label | X | |
| Button Type | X | |
| Prompt User to Save | X | |
| Display Category | X | |
| Display Length | X | |
| Display Order | X | |
| Column Width | X | |
| Default Value (text) | X | |
| Default Value (numeric) | X | |
| Enable Default | X | |
| Dependent Display Section | | X |
| Align Left | X | |
| Maximum Length | X | |
| Minimum Length | X | |
| Minimum Value | X | |
| Refresh | | X |
| Read Only | X | |
| Filtering Category | X | |
| Filtering Code | X | |
| Required for Save | X | |
| Return Page | | X |
| Returned Value | | X |
| Required for Page Complete | X | |
| Output Value | | X |
| Decimal Places | X | |
| Currency UOM | | |

Figure 6:
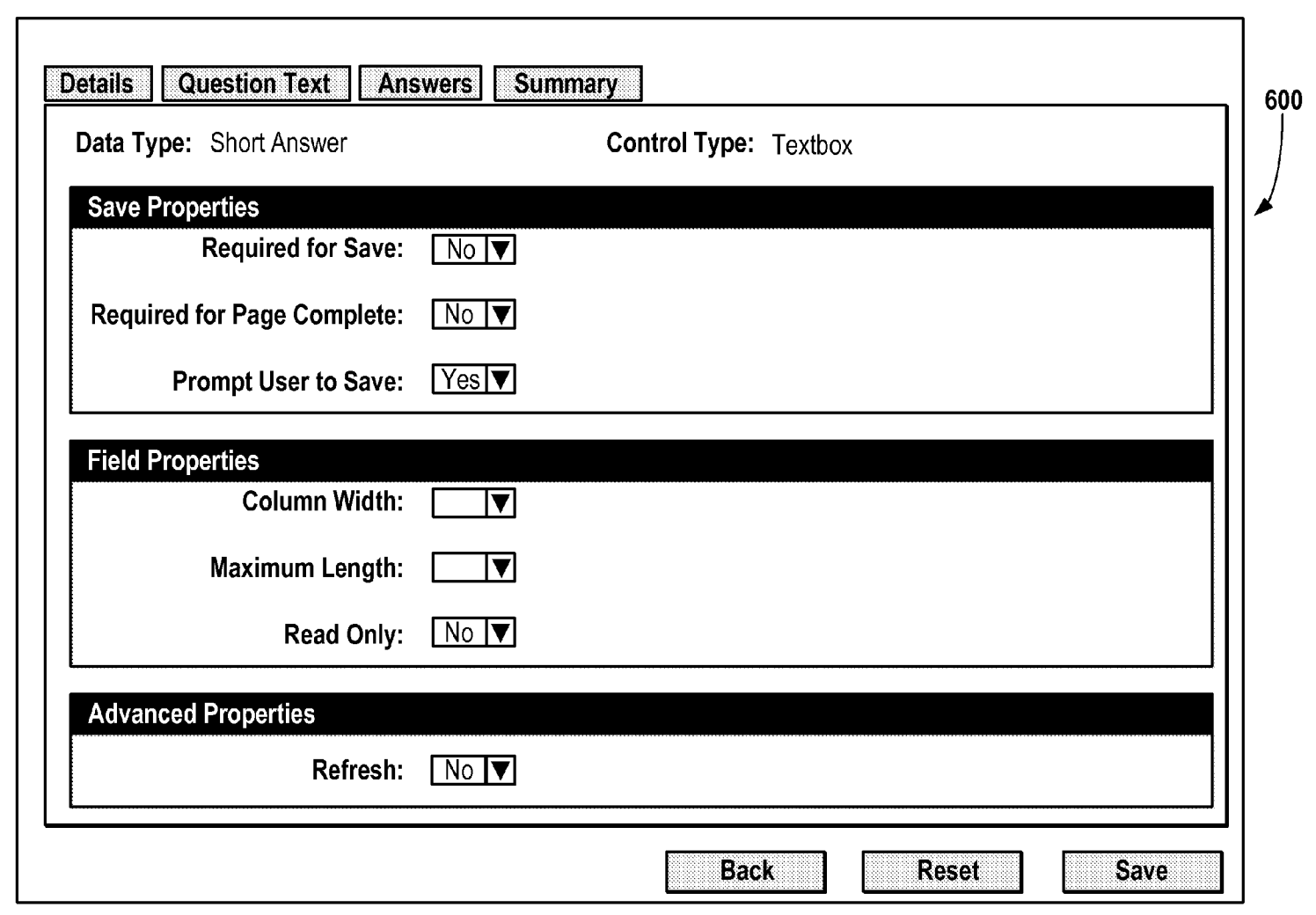
Figure 12:
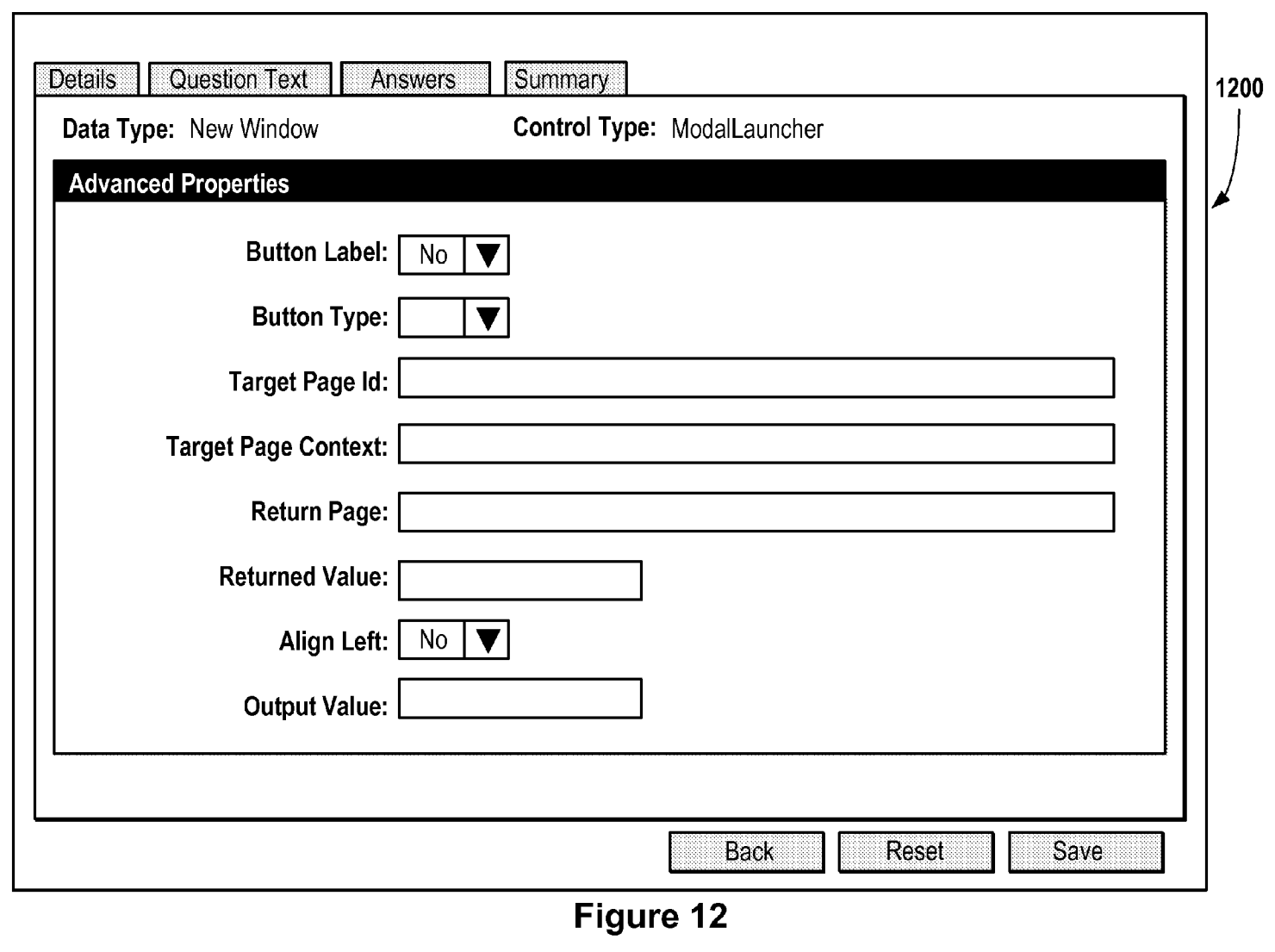

FIGS. 6-15 show various answer detail graphical user interfaces 600-1500 implemented by the answer detail parameter module 212 for receiving answer detail parameter values. In alternative implementations, the answer detail parameter module 212 may use more or fewer graphical user interfaces. FIG. 6 is one example of a short-answer detail graphical user interface 600 where the answer data type parameter value is short answer. FIG. 7 is an example of a Boolean answer detail graphical user interface 700 where the answer data type parameter value is Boolean. FIG. 8 is an example of a currency answer detail graphical user interface 800 where the answer data type parameter value is currency. FIG. 9 is an example of a date answer detail graphical user interface 900 where the answer data type parameter value is date. FIG. 10 is an example of a double answer detail graphical user interface 1000 where the answer data type parameter value is double. FIG. 11 is an example of a hyperlink answer detail graphical user interface 1100 where the answer data type parameter value is hyperlink. FIG. 12 is an example of a new window answer detail graphical user interface 1200 where the answer data type parameter value is new window. FIG. 13 is an example of a number answer detail graphical user interface 1300 where the answer data type parameter value is number. FIG. 14 is an example of a time answer detail graphical user interface 1400 where the answer data type parameter value is time. FIG. 15 is an example of a multi code value answer detail graphical user interface 1500 where the answer data type parameter value is capable of taking on or more values.

Figure 16:
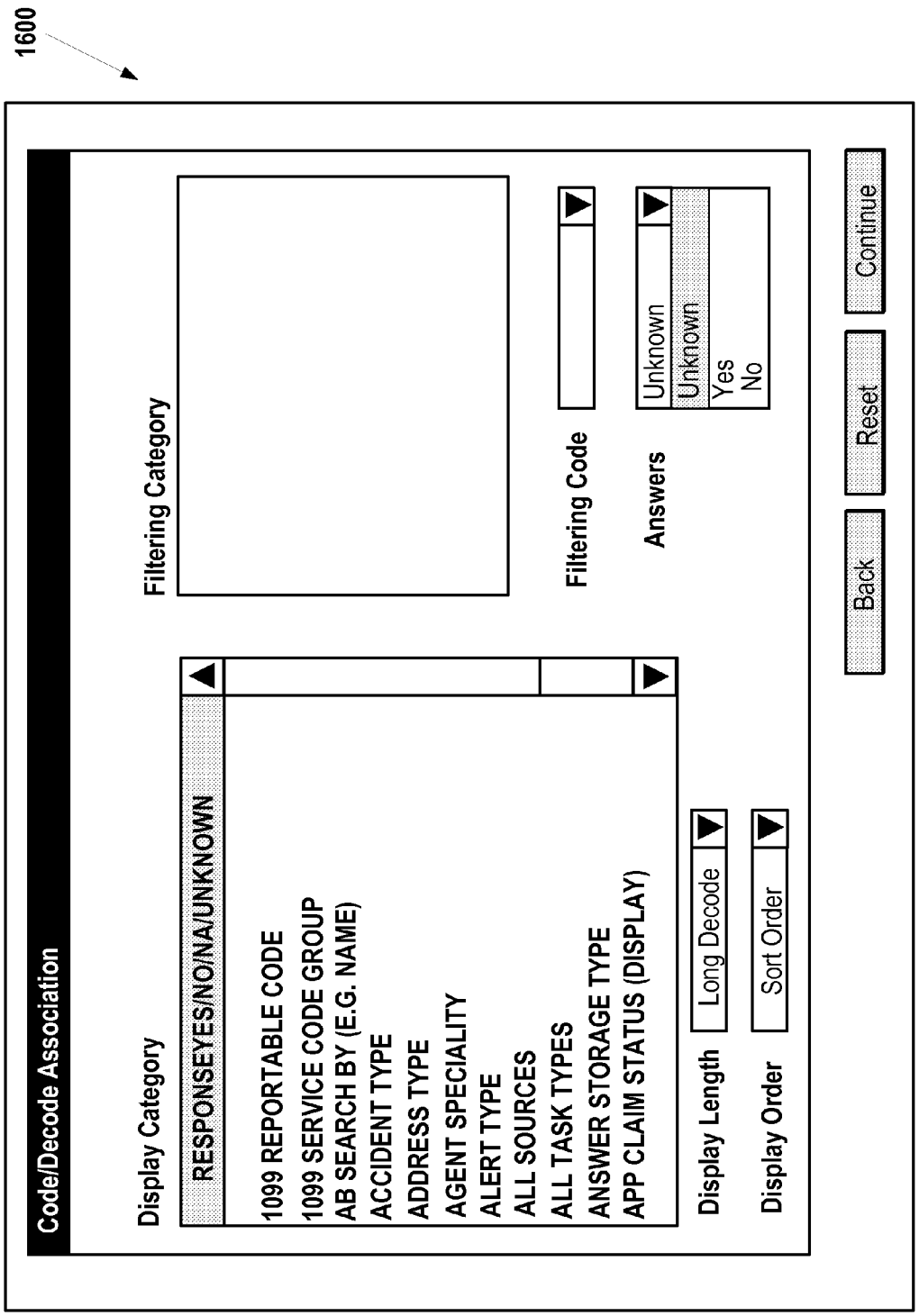
FIG. 16 shows one example of a code-decode association graphical user interface.

The answer detail parameter module 212 may also use additional graphical user interfaces for receiving answer detail parameter values. FIG. 16 shows a code-decode association graphical user interface 1600 that facilitates creating conversational question that uses a data type of code value or multi code value. The code-decode association graphical user interface 1600 helps define those parameter values that appear in the control when the conversational question is displayed. In one implementation, the code-decode association graphical user interface 1600 communicates answer detail parameters that include a display category answer detail parameter, a display length answer detail parameter, a display order answer detail parameter, and a filtering category answer detail parameter with its associated filtering code. In addition, the code-decode association graphical user interface 1600 may implement a "preview mode" to display parameter values for the conversational question before the conversational question is added to the conversational question database 116.

In general, an insurance claim processing computer system will have its own parameter representations for representing answer detail system parameters and data type system parameters. Accordingly, the conversational question generation system 102 may include an answer detail mapping module 214 that converts the conversational question parameter representations to system parameter representations of the insurance claim processing computer system. For example, after receiving the answer detail parameter values, the answer detail parameter module 212 may communicate with the answer detail mapping module 214 to associate the answer detail parameter values with their corresponding answer detail system parameter representations for use by the insurance claim processing computer system. Alternatively, or in addition, the answer detail parameter module 212 may also associate the answer data type parameter value with a data type system parameter representation.

In one implementation, answer detail mapping module 214 includes an answer detail parameter mapping schema where the answer detail system parameter representations are numerical and the answer detail conversational parameter representations are alphanumeric characters. Table 11 shows one example of an answer detail parameter mapping schema where the insurance claim processing computer system uses numerical answer detail system parameter representations.

TABLE 11

| Answer Detail Conversational Parameter Representation | Answer Detail System Parameter Representation |
| --- | --- |
| Web Address | 01 |
| Target Page Context | 02 |
| Target Page ID | 03 |
| Button Label | 04 |
| Button Type | 05 |
| Prompt User to Save | 06 |
| Display Category | 07 |
| Display Length | 08 |
| Display Order | 09 |
| Column Width | 10 |
| Default Value (text) | 11 |
| Default Value (numeric) | 12 |
| Enable Default | 14 |
| Dependent Display Section | 15 |
| Align Left | 16 |
| Maximum Length | 17 |
| Minimum Length | 18 |
| Minimum Value | 19 |
| Refresh | 20 |
| Read Only | 21 |
| Filtering Category | 22 |

TABLE 11-continued

| Answer Detail Conversational Parameter Representation | Answer Detail System Parameter Representation |
|---|---|
| Filtering Code | 23 |
| Required for Save | 24 |
| Return Page | 25 |
| Returned Value | 26 |
| Required for Page Complete | 27 |
| Output Value | 28 |
| Decimal Places | 29 |
| Currency UOM | Currency UOM |

In another implementation, the answer detail mapping module 214 includes a data type mapping schema. Table 12 shows one example of a data type mapping schema.

TABLE 12

| Data Type Conversational Parameter Representation | Data Type System Parameter Representation |
|---|---|
| Short Answer | 01 |
| Date | 02 |
| Number | 03 |
| Numeric | 04 |
| Currency | 05 |
| Code Value | 06 |
| Value | 07 |
| Long Answer | 08 |
| Multi Code Value | 09 |
| Time | 10 |
| New Window | 11 |
| Hyperlink | 12 |
| Label | 13 |

An example illustrates the operation of the answer detail parameter module 212 using the answer detail mapping module 214. FIG. 17 shows one example of a code value answer detail graphical user interface 1700 where the answer detail parameters have answer detail parameter values. In one implementation, the answer detail parameter module 212 formats the answer detail parameter values into a single string. In this implementation, the answer detail parameter values are formatted into key value pairs delimited by an ampersand "&". The left side of the key value pair contains an answer detail system parameter representation of the answer detail conversational parameter representation that is to be valued. The pair is divided by an equal sign. The right side of the pair contains the answer detail parameter value of the answer detail parameter system representation. The answer detail parameter module 212 may use code values instead of the literal representation that is displayed. For example, if the user wants to set the CodeLength property to long decode the system would save 08=04 as part of the single string. Table 13 below shows the answer detail parameter values of FIG. 17 associated with their corresponding answer detail system parameter representations.

TABLE 13

| Answer Detail Parameter | Answer Detail Parameter Value | Association with Answer Detail System Parameter Representation |
|---|---|---|
| Required for Save | No | |
| Required for Page Complete | No | 27 = False |
| Prompt User to Save | Yes | 06 = True |
| Display Category | ISO STATES | 07 = 240 |
| Display Length | LongDecode | 08 = 1 |
| Display Order | SortOrder | 09 = 2 |
| Filtering Category | ISO COUTRIES | 22 = 243 |
| Filtering Code | US | 23 = 8A |
| Enable Default | YES | |
| Default Value | | |
| Column Width | 45 | 10 = 45 |
| Read Only | No | |
| Dependant Display Section | 1§Y¤divInjuries | 15 = 1§Y¤divInjuries |
| Refresh | Yes | 20 = True |

The answer detail parameter module 212 communicates the single string to the conversational question generation module 216. The conversational question generation module 216 may then save the communicated single string in the T_DATA_TYP_DETAIL entry of the question detail database schema 202. Using the example of FIG. 17, the conversational question generation module 216 saves the single string:

06=True&07=240&08=1&09=2&10=45&15=1§Y¤div
Injuries&20=True&22=243&23=8A&27=False as the T_DATA_TYP_DETAIL entry of the question detail database schema 202 for the conversational question shown in FIG. 17.

The conversational question generation module 216 generates the conversational question from the question detail parameters, the question text parameters, and the answer detail parameters. In one implementation, the conversational question generation module 216 communicates the question detail parameter values to the conversational question database 116 based on the question detail database schema 202. In addition, the conversational question generation module 216 communicates the question text parameter values to the conversational question database 116 based on the question text database schema 204. As previously discussed, the conversational question generation module 216 also communicates the answer detail parameter values to the conversational question database 116.

The conversational question generation system 102 may also implement a conversational question summary graphical user interface. FIG. 18 shows an example of a conversational question summary graphical user interface 1800. In one implementation, the conversational question summary graphical user interface 1800 identifies where in the insurance claim processing computer system the conversational question is used. The conversational question summary graphical user interface 1800 may further include hyperlinks to each container, such as a web page, that displays the conversational question. The conversational question summary graphical user interface 1800 may also include hyperlinks to each rule that uses the conversational question for evaluation.

Figure 19:
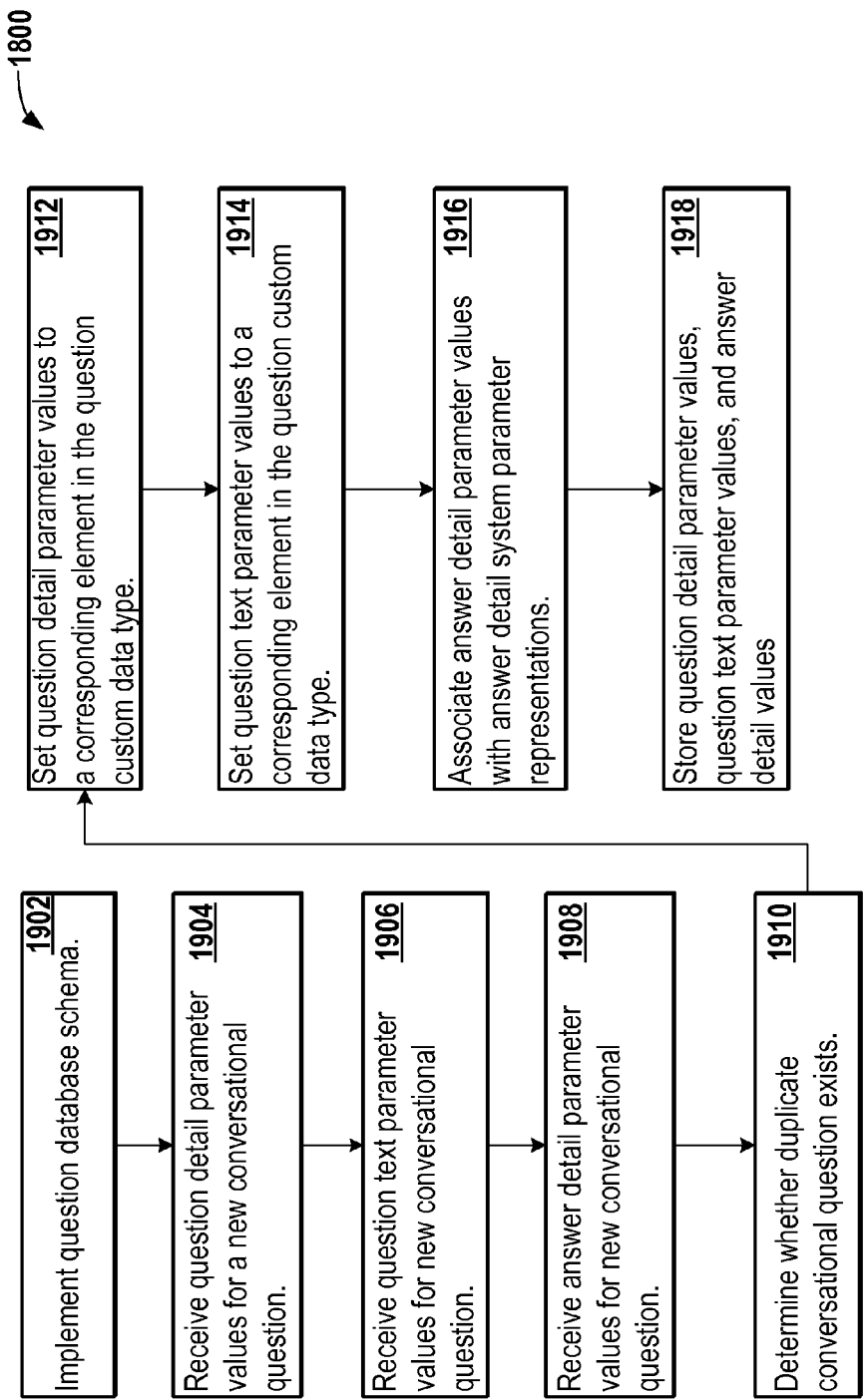
FIG. 19 shows logic flow for the conversational question generation system of FIG. 1.

FIG. 19 shows logic flow for generating a conversational question using the conversational question generation system 102 of FIG. 1. Initially, the conversational question database 116 is configured to implement the conversational question master database schema 118 (1902). The question detail parameter module 208 then receives question detail parameter values for the conversational question (1904). The question text module 210 then receives question text parameter values for the conversational question (1906). Additionally, the answer detail parameter module 210 receives answer detail parameter values for the conversational question (1908). The conversational question generation system 102 may then determine whether a duplicate conversational question exists (1910). The conversational question generation module 216 may then set question detail parameter values to a corresponding question detail parameter in the question custom data type (1912). The conversational question generation module 216 may also set question text parameter values to a corresponding element in the question custom data type (1914). The answer detail parameter module 212 may then associate answer detail parameter values with answer detail system parameter representations (1916). Finally, the conversational question generation module 216 may store the question detail parameter values, question text parameter values, and answer detail values in the conversational question database 116 (1918).

The elements illustrated in the Figures interoperate as explained in detail above. In implementing the system described above, one or more technologies may be used. However, the technologies are merely exemplary and alternative technologies may be used as well. For example, the system may be implemented in one or more computer programming languages. Examples of computer programming languages include ASP, C, and PHP. The system may also use various computer programming frameworks including the .NET framework available from Microsoft Corporation located in Redmond, Wash. The system may also use various database technologies including Microsoft SQL Server, also available from the Microsoft Corporation. In addition, the system may use markup languages, such as XML for transmitting data structures and additional data type definitions, HTML, DHTML, or other markup languages.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, or read from other machine-readable media, for example, secondary storage devices such as hard disks, floppy disks, and CD-ROMs; or other forms of ROM or RAM either currently known or later developed.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors. The schemas used herein may be any diagram, plan, scheme, organizational pattern, structure, framework, or combinations thereof. The schemas may further describe one or more databases to a database management system, including the aspects of a database, such as attributes, fields, domains, and parameters of the attributes or fields.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

I claim:

1. A conversational question generation system comprising:
    a memory storage device comprising:
        executable instructions comprising:
            a question text module configured to receive a question text of a conversational question from user input at runtime;
            a question detail parameter module configured to receive at least one question detail parameter from user input at runtime, wherein the at least one question detail parameter includes an answer data type parameter that indicates a data type of any answer to the conversational question;
            a graphical user interface for receipt of an answer to the conversational question, the graphical user interface comprising a control for receipt of the answer;
            an answer detail graphical user interface configured to receive at least one answer detail parameter from user input at runtime, wherein the answer data type parameter identifies which of a plurality of answer detail parameters the answer detail graphical user interface is dynamically configured to receive, wherein the at least one answer detail parameter includes at least one parameter of the control in the graphical user interface for receipt of the answer to the conversational question, and the at least one answer detail parameter is included in the plurality of answer detail parameters;
            an answer detail parameter module configured to receive the at least one answer detail parameter from the answer detail graphical user interface;
            a question generation module configured to generate the conversational question at runtime in a conversational question master database from the question text, the at least one question detail parameter, and the at least one answer detail parameter; and
            instructions executable to receive the answer to the conversational question through the control in the graphical user interface for receipt of the answer from user input at runtime in response to display of the conversational question; and
    a processor configured to execute the executable instructions.

2. The conversational question generation system of claim 1, wherein:
    the memory storage device further comprises an answer detail mapping module configured to map an answer detail conversational parameter representation to an answer detail system parameter representation, the at least one answer detail parameter being in the answer detail conversational parameter representation; and
    the answer detail parameter module is configured to associate the at least one answer detail parameter with the answer detail system parameter representation based on the answer detail mapping module.

3. The conversational question generation system of claim 2, wherein the answer detail mapping module is further configured to map the answer detail conversational parameter representation to a key corresponding to the answer detail system parameter representation.

4. The conversational question generation system of claim 1, wherein the at least one answer detail parameter further comprises a control type that determines a type of the control.

5. The conversational question generation system of claim 1, wherein the question text module is further configured to receive a question text language from user input at runtime, wherein the question text language identifies a human language of the question text.

6. The conversational question generation system of claim 1, wherein the at least one parameter of the control in the graphical user interface for receipt of the answer includes a width of the control.

7. The conversational question generation system of claim 1, wherein the question detail parameter module is further configured to mark the conversational question as deleted in response to user input at runtime, wherein the conversational question is not displayed when marked as deleted.

8. A computer-implemented method for generating conversational questions comprising:
receiving a question text of a conversational question from a user input device at runtime;
receiving at least one question detail parameter from the user input device at runtime, wherein the at least one question detail parameter includes an answer data type parameter that specifies a data type of an answer to the conversational question;
generating an answer detail graphical user interface, wherein the answer data type parameter identifies which of a plurality of answer detail parameters the answer detail graphical user interface is configured to receive;
generating a graphical user interface for receipt of the answer to the conversational question, the graphical user interface comprising a control for receipt of the answer;
receiving at least one answer detail parameter from the user input device at runtime through the answer detail graphical user interface, the answer data type parameter identifying the at least one answer detail parameter to be received through the answer detail graphical user interface, wherein the at least one answer detail parameter includes at least one parameter of the control in the graphical user interface for receipt of the answer to the conversational question, and the at least one answer detail parameter is included in the plurality of answer detail parameters;
generating the conversational question at runtime in a conversational question master database from the question text, the at least one question detail parameter, and the at least one answer detail parameter; and
receiving the answer to the conversational question from the user input device at runtime through the control in the graphical user interface for receipt of the answer.

9. The computer-implemented method of claim 8, further comprising displaying the control in the graphical user interface for receipt of the answer from the conversational question stored in the conversational question master database.

10. The method of claim 8 further comprising receiving the answer with a computer system without shutting down the computer system after receiving the question text with the computer system.

11. The computer-implemented method of claim 8, further comprising receiving a question text language of the question text from the user input device at runtime, wherein the question text language indicates a human language that the question text is written in.

12. The computer-implemented method of claim 8, wherein the at least one answer detail parameter includes a flag indicating whether the control is read-only.

13. The computer-implemented method of claim 8, wherein the at least one answer detail parameter includes a web address for a link control.

14. The computer-implemented method of claim 8, further comprising displaying the conversational question in response to a determination that the conversational question has not yet expired.

15. A product comprising:
a tangible machine-readable medium comprising logic embodied in the medium, the logic executable by a computer processor and configured to:
receive a question text of a conversational question from user input at runtime;
receive at least one question detail parameter from user input at runtime, wherein the at least one question detail parameter includes an answer data type parameter that indicates a data type of any answer to the conversational question;
generate an answer detail graphical user interface, wherein the answer data type parameter identifies which of a plurality of answer detail parameters the answer detail graphical user interface is dynamically configured to receive;
receive at least one answer detail parameter from user input at runtime through the answer detail graphical user interface, wherein the answer data type parameter identifies the at least one answer detail parameter to be received in the answer detail graphical user interface, wherein the at least one answer detail parameter includes at least one parameter of the control in the graphical user interface for receipt of the answer to the conversational question, and wherein the at least one answer detail parameter is included in the plurality of answer detail parameters;
generate the conversational question at runtime in a conversational question master database, the conversational question generated from the question text, the at least one question detail parameter, and the at least one answer detail parameter;
generate the graphical user interface for receipt of the answer to the conversational question, the graphical user interface comprising the control; and
receive the answer to the conversational question from user input at runtime through the control in the graphical user interface for receipt of the answer.

16. The product of claim 15, wherein the logic is further configured to:
provide a mapping of an answer detail conversational parameter representation to an answer detail system parameter representation; and
associate the at least one answer detail parameter with the answer detail system parameter representation in the conversational question master database based on the mapping of the answer detail conversational parameter representation to the answer detail system parameter representation.

17. The product of claim 16, wherein the logic is further configured to map the answer detail conversational parameter representation to a key corresponding to the answer detail system parameter representation in the conversational question master database.

18. The product of claim 15, wherein the at least one question detail parameter comprises:
a first question detail parameter including an activation date of the conversational question; and,
a second question detail parameter including an expiration date of the conversation question.

19. The product of claim 15, wherein the at least one question detail parameter comprises a unique identifier for an application to which the conversational question is assigned.

20. The product of claim 15, wherein the at least one answer detail conversational parameter is associated with the at least one question detail parameter based on the answer data type parameter.

21. The product of claim 15, wherein the logic is further configured to create conversational questions in a computer system from user input in addition to the conversational question and to receive answers to the conversation questions in the computer system from user input without a restart of the computer system.

22. The product of claim 15, wherein the logic is further configured to remove the conversational question in the conversational question master database.

* * * * *

UNITED STATES PATENT AND TRADEMARK OFFICE
CERTIFICATE OF CORRECTION

PATENT NO. : 8,478,769 B2  
APPLICATION NO. : 12/036103  
DATED : July 2, 2013  
INVENTOR(S) : Eugene Goldfarb Page 1 of 1

It is certified that error appears in the above-identified patent and that said Letters Patent is hereby corrected as shown below:

On the Title Page

In Other Publications, at Page 12

Column 2, line 17, change -- Apendix -- to "Appendix".

In the Specification

In Column 15, line 17, insert -- . -- after "question".

Signed and Sealed this  
Fifth Day of November, 2013

Teresa Stanek Rea  
*Deputy Director of the United States Patent and Trademark Office*